(12) United States Patent
de Matos Ravanelli et al.

(10) Patent No.: US 10,670,753 B2
(45) Date of Patent: Jun. 2, 2020

(54) HISTORY MATCHING OF TIME-LAPSE CROSSWELL DATA USING ENSEMBLE KALMAN FILTERING

(71) Applicants: SAUDI ARABIAN OIL COMPANY, Dhahran (SA); KING ABDULLAH UNIVERSITY OF SCIENCE AND TECHNOLOGY, Thuwal (SA)

(72) Inventors: Fabio Miguel de Matos Ravanelli, Dhahran (SA); Ibrahim Hoteit, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 802 days.

(21) Appl. No.: 14/195,260

(22) Filed: Mar. 3, 2014

(65) Prior Publication Data
US 2015/0247940 A1 Sep. 3, 2015

(51) Int. Cl.
G06G 7/48 (2006.01)
G01V 1/30 (2006.01)
G01V 99/00 (2009.01)

(52) U.S. Cl.
CPC .......... *G01V 1/30* (2013.01); *G01V 1/305* (2013.01); *G01V 99/00* (2013.01); *G01V 2210/612* (2013.01); *G01V 2210/64* (2013.01); *G01V 2210/665* (2013.01)

(58) Field of Classification Search
CPC .......... G01V 1/30; G01V 99/00; G01V 1/305; G01V 2210/665; G01V 2210/612; G01V 2210/64

USPC .......................................................... 703/10
See application file for complete search history.

(56) References Cited

U.S. PATENT DOCUMENTS

| | | | |
|---|---|---|---|
| 7,584,081 B2 | 9/2009 | Wen et al. | |
| 7,620,534 B2 | 11/2009 | Pita et al. | |
| 7,660,711 B2 | 2/2010 | Pita et al. | |
| 7,672,825 B2 | 3/2010 | Brouwer et al. | |
| 8,195,401 B2 | 6/2012 | Ella et al. | |
| 8,255,165 B2 | 8/2012 | Chu | |
| 8,417,496 B2 | 4/2013 | Main et al. | |
| 8,451,683 B2 | 5/2013 | Chu et al. | |
| 8,515,721 B2 | 8/2013 | Morton et al. | |
| 2002/0013687 A1* | 1/2002 | Ortoleva | E21B 41/0064 703/10 |
| 2002/0120429 A1 | 8/2002 | Ortoleva | |

(Continued)

OTHER PUBLICATIONS

A. Chawathe, A. Ouenes, W.W. Weiss "Interwell Property Mapping Using Crosswell Seismic Attributes" SPE 38747, 1997, pp. 467-474.*

(Continued)

*Primary Examiner* — Dwin M Craig
(74) *Attorney, Agent, or Firm* — Bracewell LLP; Constance G. Rhebergen; Albert B. Kimball, Jr.

(57) ABSTRACT

Data from crosswell seismic surveys is processed to provide crosswell time-lapse data to map fluid changes in a reservoir where time-lapse or 4D seismic data is unavailable or unreliable, such as in onshore reservoirs. The resultant processing results provide quantitative information for history matching purposes using a probabilistic approach to take in account uncertainties in the geological model and reduce uncertainties in reservoir production forecasts.

19 Claims, 17 Drawing Sheets
(12 of 17 Drawing Sheet(s) Filed in Color)

(56) References Cited

U.S. PATENT DOCUMENTS

| | | | |
|---|---|---|---|
| 2007/0118346 A1* | 5/2007 | Wen | E21B 43/00 703/10 |
| 2008/0162100 A1 | 7/2008 | Landa | |
| 2009/0145600 A1* | 6/2009 | Wu | G01V 1/50 166/250.02 |
| 2009/0182509 A1* | 7/2009 | Kimminau | E21B 47/06 702/11 |
| 2010/0195436 A1* | 8/2010 | Kamata | G01V 1/44 367/25 |
| 2010/0198570 A1 | 8/2010 | Sarma et al. | |
| 2011/0232902 A1* | 9/2011 | Chu | G01V 1/30 166/250.01 |
| 2012/0150445 A1* | 6/2012 | Aarre | G01V 99/00 702/2 |
| 2012/0191433 A1 | 7/2012 | Heidari et al. | |
| 2012/0232865 A1 | 9/2012 | Maucec et al. | |
| 2012/0265512 A1 | 10/2012 | Hu et al. | |
| 2013/0346040 A1 | 12/2013 | Morales German et al. | |

OTHER PUBLICATIONS

David E. Lumley "Seismic Monitoring of Hydrocarbon Fluid Flow" Journal of Mathematical Imaging and Vision, 5, 1995, pp. 287-296.*

Michael Holmes et al., "Petrophysical Rock Physics Modeling: A Comparison of the Krief and Gassmann Equations, and Applications to Verifying and Estimating Compressional and Shear Velocities," SPWLA 46th Annual Logging Symposium, Jun. 26-29, 2005; 14 pages.

Lin Liang et al., "Joint Inversion of Time-Lapse Crosswell Seismic and Production Data for Reservoir Monitoring and Characterization," International Petroleum Technology Conference 16505, Mar. 26-28, 2013; 6 pages.

Lin Liang et al., "Improved Estimation of Permeability from Joint Inversion of Time-Lapse Croswell Electromagnetic and Production Data using Gradient-Based Method," Society of Petroleum Engineers 146526, Oct. 30-Nov. 2, 2011; 10 pages.

Jesper Spetzler et al., "Case Story: time-lapse seismic crosswell monitoring of CO2 injected in an onshore sandstone aquifer," Geophys. J. Int. 172, 2008; pp. 214-225.

Tein-when Lo et al., "Reservoir Characterization with Crosswell Tomography: A Case Study in the Midway Sunset Field, California," Society of Petroleum Engineers 22336, Mar. 24-27, 1992; pp. 87-96.

Denis Kiyashchenko et al., "Time-lapse down-hole seismic surveys for deep EOR target monitoring in South Oman," SEG Annual Meeting 2011; pp. 4244-4248.

Michael L. Batzle et al., "Fluid mobility and frequency-dependent seismic velocity—Direct measurements," Geophysics vol. 71, No. 1, Jan.-Feb. 2006; pp. N1-N9.

M.A. Biot, "Theory of Propagation of Elastic Waves in a Fluid-Saturated Porous Solid. II. Higher Frequency Range," Journal of the Acoustical Society of America, vol. 28, No. 2, Mar. 1956; pp. 179-191.

J.A. Skjervheim et al., "Incorporating 4D Seismic Data in Reservoir Simulation Models Using Ensemble Kalman Filter," Society of Petroleum Engineers, Sep. 2007 Journal; pp. 282-292.

Aanonsen et al., "The Ensemble Kalman Filter in Reservoir Engineering—a Review", SPE Journal , 2009, pp. 393-412, Society of Petroleum Engineers, XP002740666.

International Search Report and Written Opinion for related PCT application PCT/US2015/016297 dated Jul. 17, 2015.

Emerick et al., "History matching time-lapse seismic data using the ensemble Kalman filter with multiple data assimilations", Computational Geosciences, 2012, pp. 639-659, Springer Science + Business Media, XP002740667.

Haugen et al., "History Matching Using the Ensemble Kalman Filter on a North Sea Field Case", SPE Journal, 2008, pp. 382-389, Society of Petroleum Engineers, XP002740665.

Leeuwenburgh et al., "Ensemble-based conditioning of reservoir models to seismic data", Computational Geosciences, 2010, pp. 359-378, vol. 15, No. 2, Springer Science + Business Media BV.

Ravanelli, "History Matching of 4D Seismic Data Attributes using the Ensemble Kalman Filter", In Partial Fulfillment of the Requirements for the Degree of Master of Science, 2013, pp. 1-84, XP002740663.

F. Gassmann, "Uber die Elastizitat poroser Medien," Inst. fur Geophysik and der ETH., Mar. 31, 1951; 23 pages.

K. Coats, Reservoir Simulation, Petroleum Engineering Handbook, Chapter 48, 1987, pp. 1-20.

Samuel H. Gray, "Seismic Imaging" GEOPHYSICS, Jan.-Feb. 2001; pp. 15-17, vol. 66, No. 1, Veritas DGC Inc., Calgary, Alberta, CA.

Vijay K. Madisetti et al, Seismic Migration Alorithms on Parallel Computers, C3P Proceeding of the Third Converence on Hypercube Concurrent Computers and Applications, 1988, pp. 1180-1186, vol. 2, ACM, New York, NY, US.

* cited by examiner

FIG. 7  TRUE POROSITY FIELD
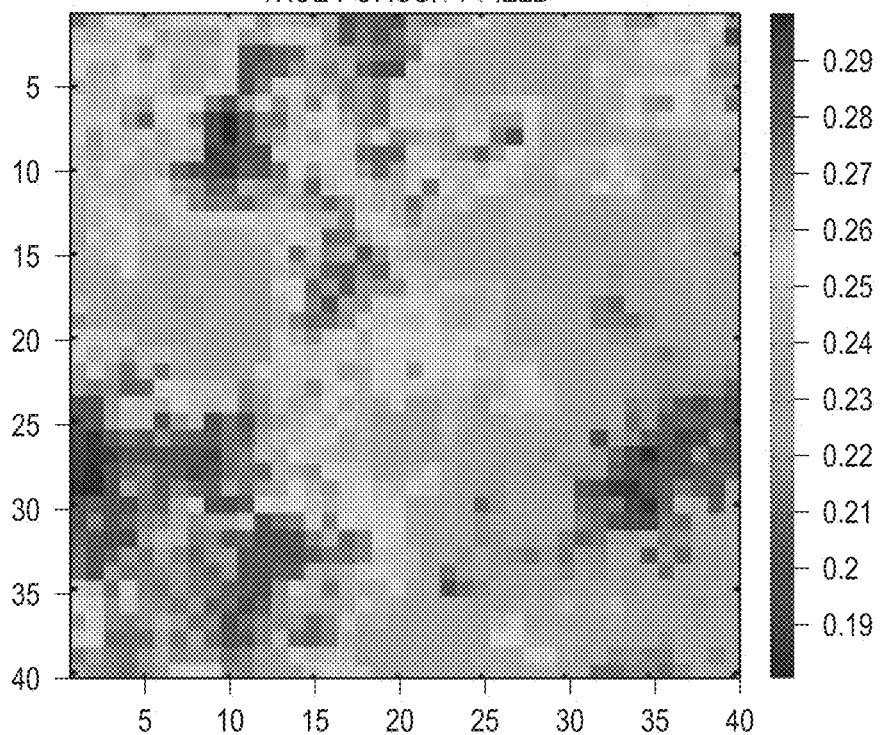
FIG. 8  TRUE PERMEABILITY FIELD
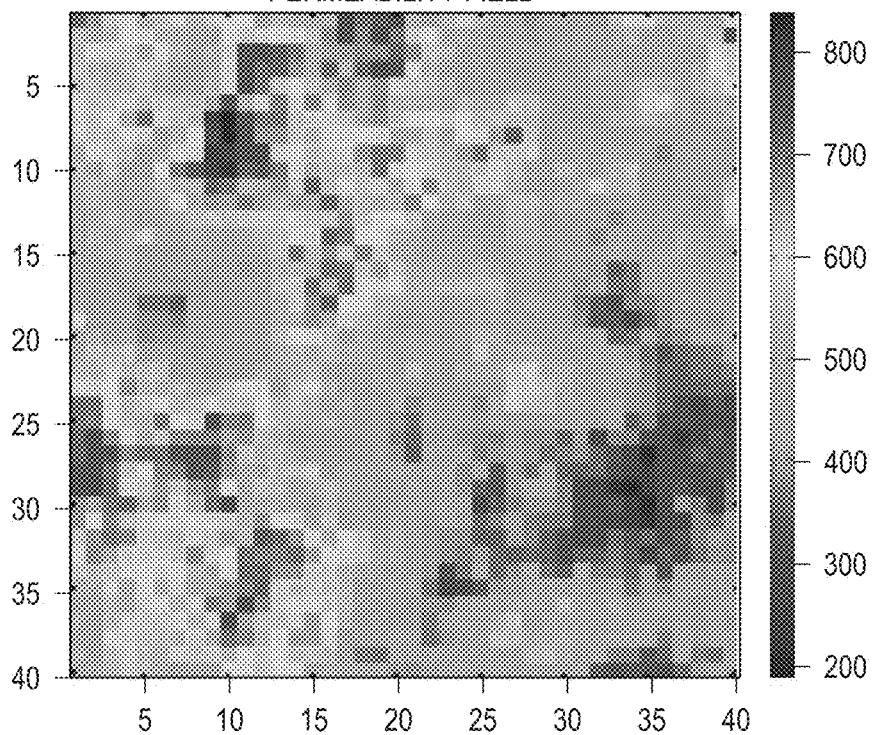

FIG. 11 CORRELATION BETWEEN POROSITY AND PERMEABILITY
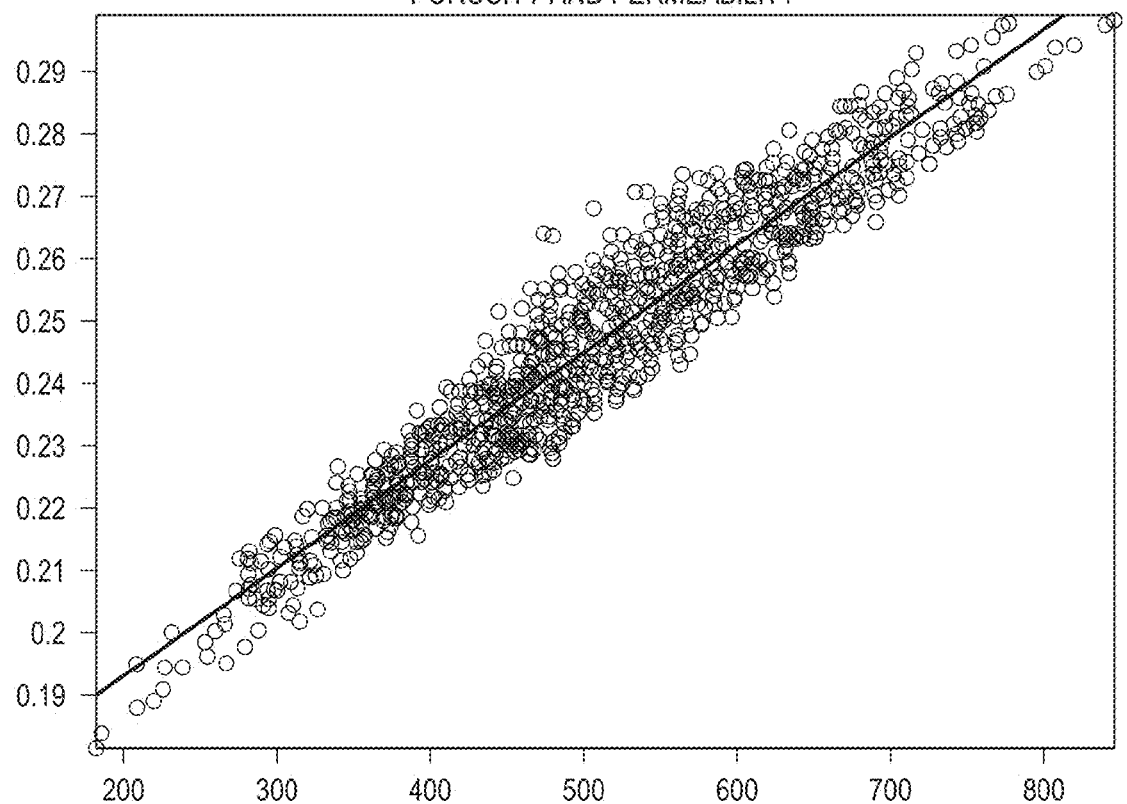
FIG. 12 WITHOUT DATA ASSIMILATION
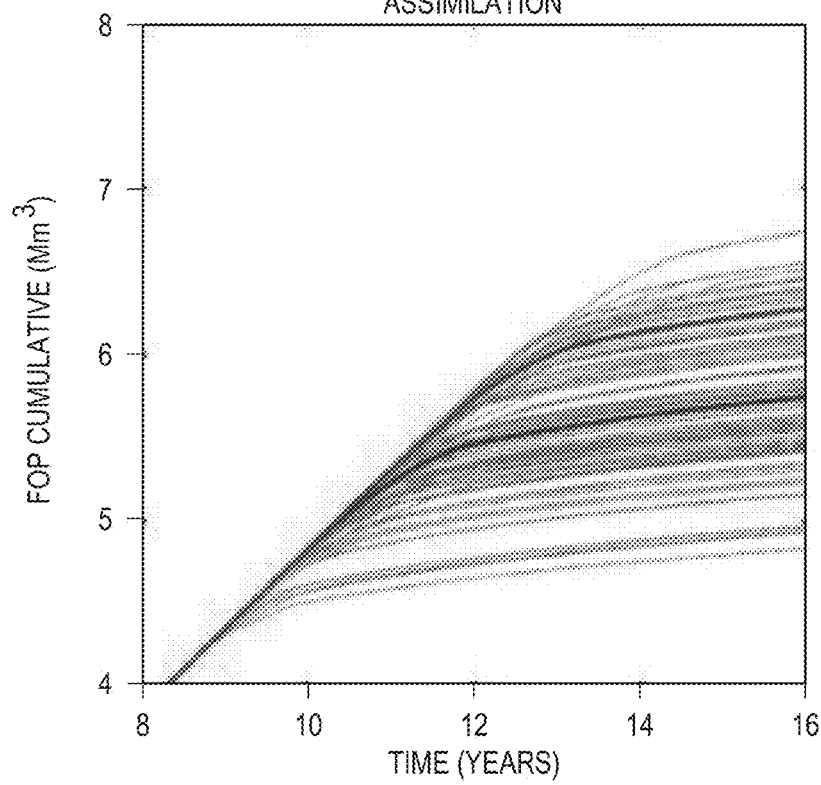

HISTORY MATCHING OF TIME-LAPSE CROSSWELL DATA USING ENSEMBLE KALMAN FILTERING

BACKGROUND OF THE INVENTION

1. Field of the Invention

The present invention relates to history matching in petroleum reservoir simulations, and more particularly obtaining information about changes in fluid displacement in reservoirs of onshore fields where surface time-lapse seismic surveys cannot be readily performed.

2. Description of the Related Art

Generating accurate production forecasts is an area of major concern for the oil industry. Using uncertain production and reserves forecasts for investment decisions leads to a significant risk of sub-optimal performance. It is difficult and expensive to generate consistent models to accurate represent oil fields due to geological complexities, the size of the reservoir model, and the amount of data being produced. For a large reservoir, such as the type known in the industry as a giant reservoir, the number of grid cells can often exceed hundreds of millions. This number of cells is required in order to have adequate resolution to represent flow dynamics, formation rock porosity and permeability heterogeneity, and many other geologic and depositional complexities within the reservoir. Needless to say, a reservoir model is a complex dynamic system.

Regardless of the stage of development of a field, its representation is equally challenging. A new field starting production has limited amounts of data. Traditionally, few wells are put to production in the early stages of development. Thus, little information is known, and a reliable reservoir model can only be properly built after several years of production data are acquired.

For a mature reservoir, on the other hand, there is a vast amount of data which presents a challenge to a reservoir engineer. A mature reservoir can have in excess of a hundred producing wells, millions of active grid cells and production data gathered over many decades.

Usually, present reservoir studies start by the acquisition of 3D seismic data at the early stages of development and appraisal to obtain a clear picture of the field. This dataset is used to give the exploration and production teams a wider view of the field, reducing development uncertainties, and providing a better understanding of how to develop the field for optimum production. Only few wells are usually drilled in early stages, due to economic constrains. This provides a limited amount of information about the petrophysical properties of the rocks, pressure, saturation, rock composition and fluid composition, which are only known at the well locations. These limited amounts of information are used to create a first reservoir model. The model is not static and it is continuously updated as more information becomes available through a process known as history matching.

History matching is an important tool to obtain more accurate models to describe the reservoir, thus improving the capability of producing accurate forecasts. This is highly related to good reservoir management practices. Until recently, history matching was done by updating the reservoir model parameters to match historical production data. This was often an underdetermined inverse problem with multiple solutions. Different models might fit the given production data regardless of whether or not they were geologically accurate.

During the production stage from wells in a reservoir, not only the oil production rate (OPR) is measured, the gas oil rate (GOR) and the water cut (WCT) are also measured as these are important measures. The oil production rate represents the gross revenue obtainable, while high GOR and WCT measures indicate factors which reduce potential income.

Fluid samples and the static bottomhole pressure (SBHP) are also measured at selected wells during production to ensure consistency with the development plan and simulations being carried out. The measured pressure contains information about the reservoir continuity, fluid contacts and its depletion mechanism. These parameters are taken into consideration during the history matching process.

Conventional history matching was designed as a trial and error process making it a complex and time consuming task. Considerable investment has been made in recent years to improve history matching practices. Computer-assisted methods have been under development to help reservoir engineers explore new complex geological areas and to efficiently deal with ever-increasing amounts of data being produced.

Among the most successful methods employed to condition reservoir models to production data are conjugate gradient optimization methods and ensemble based Bayesian filtering methods. Conjugate gradient methods require the calculation of the gradient of an objective function measuring the model fit with the data. This is a challenging task because it requires developing and running the adjoint code of the reservoir model.

A recent advancement in history matching is the use of time-lapse seismic data to help understand the fluid displacement in the reservoir. Time-lapse seismic data, also known as 4D seismic data, provides more spatial coverage than other reservoir data sets. Time-lapse seismic or 4D seismic data have been used with success in the oil industry to improve reservoir understanding, which in turn has great importance for reservoir management applications. The qualitative use of 4D seismic in its simplest form allows the identification of undrained areas "hot spots", allowing reservoir engineers to properly design better management practices to improve oil recovery.

4D seismic surveying is performed by repeatedly shooting 3D seismic surveys with arrays of closely spaced receivers and shot lines at the surface over the same area at different times. The infill fluids present in the reservoir rocks have different acoustic impedances. The difference between two seismic surveys over time indicated by changes of acoustic impedance can then be used to highlight unexplored compartments and track movements of flood fronts.

Qualitative approaches have been implemented in the past decade to use 4D seismic data sets, allowing development possibilities including better well placement and fluid drainage. The use of more sophisticated quantitative approaches has recently become possible. However, because of the nature and complexity of the data, which can exceed by several orders of magnitude the multiple millions of grid cells in a large reservoir, most of the research performed so far only dealt with inverted seismic data for elastic parameters, mainly acoustic impedance and Poisson's ratio. Other seismic and elastic attributes were at times also used.

To be considered a good candidate for a time-lapse study the analyzed data needs to show significant variation over production activity. Density variations due to fluid saturation changes are minimal, usually in the range of 1%, thus they cannot be accounted for due to noise and uncertainty levels. The major variation occurs in the velocity field and consequently bulk modulus of the rocks.

Other studies have tested alternative approaches to include time-lapse seismic in history matching studies. One approach was to directly assimilate seismic data, before inversion and in amplitude form. J. A. Skjervheim and B. O. Ruud, *Combined Inversion of 4D Seismic Waveform Data And Production Data Using Ensemble Kalman Filter*, 2006. A similar approach extended this to a 3D reservoir. O. Leeuwenburgh, J. Brouwer, and M. Trani, *Ensemble-Based Conditioning Of Reservoir Models To Seismic Data*, Computational Geosciences, 2011, 15(2): p. 359-378. Another approach assimilated reparameterized seismic data in terms of arrival times at the interpreted fluid fronts. M. Trani, R. Arts, and O. Leeuwenburgh, *Seismic History Matching of Fluid Fronts Using the Ensemble Kalman Filter*, SPE Journal, 2013, 18(1): p. 159-171.

In addition to the processing complexities above for reservoirs in general, the technology of time lapse seismic data acquisition faces major challenges in onshore fields. In onshore fields, it is almost impossible in most cases to acquire time-lapse data. This occurs mainly because changes in the surface environment (construction of surface facilities, urban expansion, alterations in the environment and other reproducibility issues). These changes over time in the surface environment become part of the data content of the 4D surveys, and thus prevent observing differences between 4D seismic surveys to monitor reservoir performance. This is a primary reason that many oil producing companies do not have 4D seismic data for their onshore oil fields.

SUMMARY OF THE INVENTION

Briefly, the present invention provides a new and improved method of history matching a reservoir model of an onshore reservoir producing hydrocarbon fluids from wells in the reservoir based on actual production from the reservoir over time and reservoir formation attribute data. A crosswell seismic survey is conducted between wells in the reservoir, and data from the crosswell seismic survey processed in a computer to obtain data about the reservoir formation attribute. An updated value of the reservoir formation attribute is determined in the computer, and the updated value of the reservoir formation attribute provided to adjust the reservoir model in the computer.

The present invention also provides a new and improved computer implemented method of history matching a reservoir model of an onshore reservoir producing hydrocarbon fluids from wells in the reservoir based on actual production from the reservoir over time and reservoir formation attribute data based on results of a crosswell seismic survey conducted between wells in the reservoir. Data from the crosswell seismic survey is processed in the computer to obtain data about the reservoir formation attribute, and an updated value determined of the reservoir formation attribute. The determined updated value of the reservoir formation attribute is provided by the computer to adjust the reservoir model.

The present invention also provides a new and improved data processing system for history matching a reservoir model of an onshore reservoir producing hydrocarbon fluids from wells in the reservoir based on actual production from the reservoir over time and reservoir formation attribute data based on results of a crosswell seismic survey conducted between wells in the reservoir. The data processing includes a processor which processes data from the crosswell seismic survey to obtain data about the reservoir formation attribute, and determines an updated value of the reservoir formation attribute. The processor provides the updated value of the reservoir formation attribute to adjust the reservoir model.

The present invention also provides a new and improved data storage device which has stored in a non-transitory computer readable medium computer operable instructions for causing a data processing system to perform history matching a reservoir model of an onshore reservoir producing hydrocarbon fluids from wells in the reservoir based on actual production from the reservoir over time and reservoir formation attribute data based on results of a crosswell seismic survey conducted between wells in the reservoir. The instructions stored in the data storage device cause the processors to process data from the crosswell seismic survey to obtain data about the reservoir formation attribute, and determine an updated value of the reservoir formation attribute. The instructions also cause the processor to provide the updated value of the reservoir formation attribute to adjust the reservoir model.

The present invention also provides a new and improved computer implemented method of history matching a reservoir model based on production data from an onshore reservoir and reservoir formation attribute data acquired from base crosswell seismic surveys between wells in the reservoir at a select time during production. A number of potential geological ensembles for the formation attributes are formed based on the reservoir model in its present state, and iteration in time is made to a time of a most recent reservoir model. The reservoir formation attribute data is updated based on production data prior to the most recent reservoir model, and the reservoir model updated with the updated reservoir formation attribute data. A time increment is advanced from the time of the most recent reservoir model. At the advanced time increment a crosswell survey is determined for the number of potential geological ensembles using the updated reservoir model. A travel time lapse difference is determined for the crosswell surveys for the number of potential geological ensembles, and the potential geological ensemble with a travel time lapse most close to that of the most recent reservoir model determined at the advanced time increment. The reservoir model is updated with the formation attributes of the potential geological ensemble with a travel time lapse most close to that of the most recent base crosswell seismic survey.

The present invention also provides a new and improved data processing system for history matching a reservoir model based on production data from an onshore reservoir and reservoir formation attribute data acquired from base crosswell seismic surveys between wells in the reservoir at a select time during production. Based on the instructions stored in the data storage device, a number of potential geological ensembles for the formation attributes are formed by a processor in the data processing system based on the reservoir model in its present state, and iteration in time is made to a time of a most recent reservoir model. The reservoir formation attribute data is updated by the processor based on production data prior to the most recent reservoir model, and the reservoir model updated with the updated reservoir formation attribute data. A time increment is advanced in the processor from the time of the most recent reservoir model. At the advanced time increment a crosswell survey is determined by the processor for the number of potential geological ensembles using the updated reservoir model. A travel time lapse difference is determined in the processor for the crosswell surveys for the number of potential geological ensembles, and the potential geological ensemble with a travel time lapse most close to that of the most recent reservoir model determined at the advanced time increment. The reservoir model is updated by the processor with the formation attributes of the potential geological ensemble with a travel time lapse most close to that of the most recent base crosswell seismic survey.

The present invention also provides a new and improved data storage device which has stored in a non-transitory computer readable medium computer operable instructions for causing a data processing system to perform history matching a reservoir model based on production data from an onshore reservoir and reservoir formation attribute data acquired from base crosswell seismic surveys between wells in the reservoir at a select time during production. A number of potential geological ensembles for the formation attributes are formed based on the reservoir model in its present state, and iteration in time is made to a time of a most recent reservoir model. The reservoir formation attribute data is updated based on production data prior to the most recent reservoir model, and the reservoir model updated with the updated reservoir formation attribute data. A time increment is advanced from the time of the most recent reservoir model. At the advanced time increment a crosswell survey is determined for the number of potential geological ensembles using the updated reservoir model. A travel time lapse difference is determined for the crosswell surveys for the number of potential geological ensembles, and the potential geological ensemble with a travel time lapse most close to that of the most recent reservoir model determined at the advanced time increment. The reservoir model is updated with the formation attributes of the potential geological ensemble with a travel time lapse most close to that of the most recent base crosswell seismic survey.

BRIEF DESCRIPTION OF THE DRAWINGS

The application file contains at least one drawing executed in color. Copies of this patent application publication with color drawings will be provided by the Patent and Trademark Office upon request and payment of the necessary fee.

FIG. 7 is a display of a porosity field used as a model for processing according to the present invention.

FIG. 8 is a display of a permeability field used as a model for processing according to the present invention.

FIG. 11 is a plot of the data correlation between the porosity field of FIG. 7 and the permeability field of FIG. 8.

FIG. 12 is a plot of potential cumulative oil production from a model reservoir for various possible porosities and permeabilities.

DETAILED DESCRIPTION OF THE PREFERRED EMBODIMENTS

Crosswell Seismic Surveying

With the present invention, it has been found that crosswell seismic data can be used as a source of time-lapse information for processing according to the present invention to provide information for reservoir analysts and engineers regarding fluid displacement within a reservoir. The crosswell seismic data is also more reproducible than current techniques (4D seismic), requires less time to be acquired and has lower data acquisition costs when compared to 4D seismic.

Figure 1:
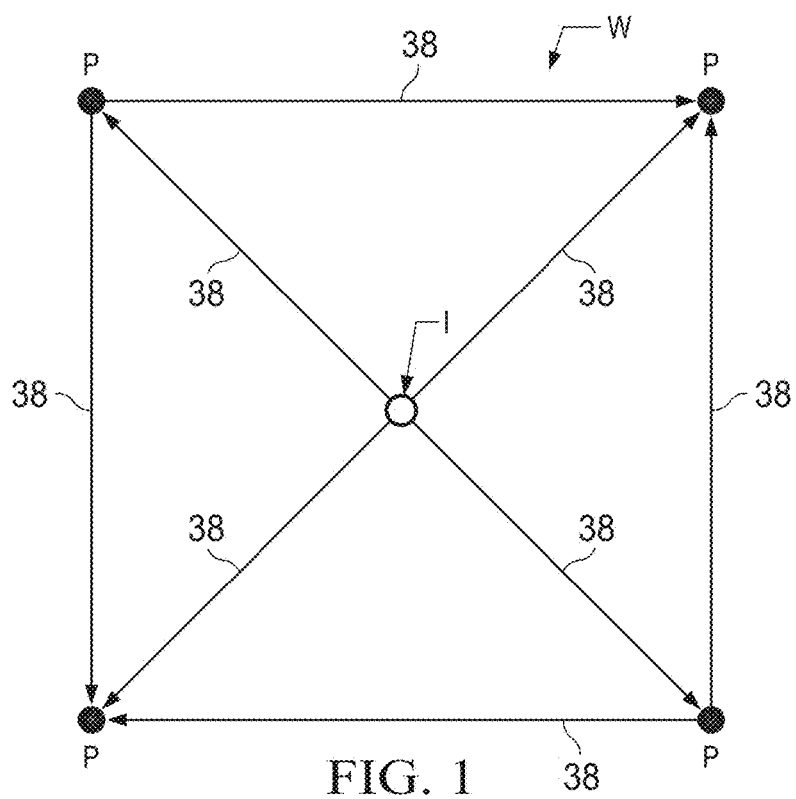
FIG. 1 is a surface diagram of source wells and receiver wells for a crosswell seismic data survey.
Figure 2:
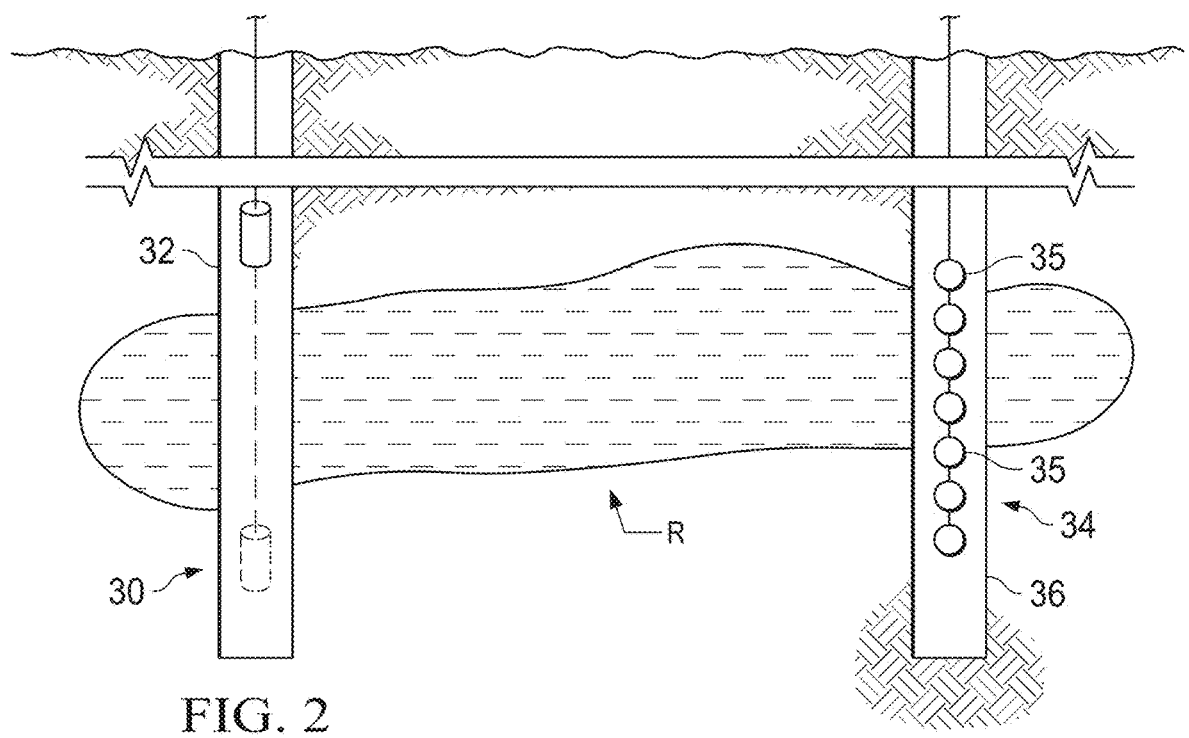
FIG. 2 is a schematic diagram, taken in cross-section, of a crosswell seismic data survey between a source well and a receiver well.

FIG. 1 indicates schematically a map of the relative locations of a group of wells W, including an injector well I and four producer wells P involved in the production of oil from a subsurface reservoir R (FIG. 2). During a crosswell seismic survey, a seismic source line 30 is lowered by wireline in a borehole 32 of one of the wells W to a selected depth or depths of interest relating to the reservoir R. A receiver array 34 of receivers or geophones 35 is also lowered in a borehole 36 of other adjacent wells W.

The sources 30 are activated generating seismic impulses that propagate along the interwell region through the reservoir R. The seismic impulse signal is captured after travel through the interwell region by the receivers 35 in the adjacent wells W. An initial survey or base survey is made before production has begun is from the reservoir R.

As indicated by arrows 38 in FIG. 1, for the purpose of the present invention, time lapse data is acquired for each pair of adjacent wells W: between the injector well I and the producer wells P, and between each of the adjacent pairs of producer wells P.

Thus travel-time information for the interwell region is recorded. The interwell travel time information is then processed with what is known as crosswell tomographic processing in a computer or data processing system such as D (FIG. 6) to yield data or information about formation properties and acoustic velocity in the reservoir R.

A further acquisition of crosswell seismic data for the wells W is performed in a monitor crosswell seismic survey after sufficient time has elapsed so there is enough fluid displacement in the field such that a significant difference in the time-lapse signal can be measured. Further monitor surveys are taken at comparable time intervals during production from the reservoir R. This data is used, as will be described, during the history matching process to better constrain porosity and permeability distributions.

The difference between the monitor and the base surveys after suitable processing provides information about the fluid properties in this region and can be used to improve the quality of the simulation model being used to forecast production for this reservoir.

Crosswell seismic data provides what are known as P and S wave data that can be used to compute velocity tomograms. The velocity changes can then be mapped over time and linked to fluid displacement in the reservoir. This provides a smaller data coverage area, but avoids reproducibility issues especially in onshore fields were time-lapse data is still a major challenge. Time-lapse surveys cannot be conducted in many onshore fields due to surface limitations which could for instance happen after an urban expansion and/or some changes in the environment.

Typically surface seismic applications use low frequencies (in the range of 0 to 100 Hz). The major reason for this limited range of frequencies is the fact that high frequencies are more attenuated, which limits the maximum distance than can be imaged. With the present invention, the crosswell tomographies obtained from the crosswell surveys provide transmission images in which sources and receivers are opposite to each other, thus the attenuation is less intense than in the conventional surface seismic surveys where the seismic waves need to travel through the overburden and back again. Typical frequencies used in crosswell images are in the range of few hundred Hz. At higher acquisition frequencies the velocity dispersion phenomena delivers valuable information about the fluid content in the media. This may not be properly modeled using the Gassman fluid displacement currently used in reservoir modeling. According to the present invention, a Biot velocity model can be used, as will be explained below, to predict elastic properties at the high frequency limit.

Crosswell tomographies are presently used in enhanced oil recovery (EOR) applications by steam injection to track the flooding process due to temperature variations and $CO_2$ injection. However the approach used so far is qualitative, and a more sophisticated approach is required to retrieve as much information as possible about the fluid displacement inside the reservoir. Some quantitative uses for this type of data have been attempted. Liang, et al., *Improved Estimation of Permeability from Joint Inversion of Time-Lapse Crosswell Electromagnetic and Production Data Using Gradient-Based Method in SPE Annual Technical Conference and Exhibition*, 2011, used crosswell electromagnetic and production data to estimate permeability in a synthetic model using iterative Gauss-Newton optimization. Liang, et al, *Joint Inversion Of Time-Lapse Crosswell Seismic And Production Data For Reservoir Monitoring And Characterization*, 6th International Petroleum Technology Conference, 2013, used the same methodology to incorporate inverted seismic and production data using wave form inversion. Both studies use gradient based methods which are not suitable for highly non-linear and complex models for which the Ensemble Kalman Filtering with the present invention may provide accurate estimates at a fraction of the computational cost and implementation efforts.

| NOMENCLATURE | |
|---|---|
| OPR = | Oil Production Rate |
| WCT = | Water Cut |
| BHP = | Bottomhole pressure |
| SBHP = | Static Bottomhole pressure GOR |
| GOR = | Gas Oil Rate |
| RRMS = | Relative Root Mean Square Error |
| PDF = | Probability Density Function |
| EnKF = | Ensemble Kalman Filter |

-continued

NOMENCLATURE

| | |
|---|---|
| STD = | Standard Deviation |
| $V_p$ = | Primary Velocity |
| $V_s$ = | Shear Velocity |
| KF = | Kalman Filter |
| $K_{dry}$ = | Bulk Modulus Dry Rock |
| $K_{sat}$ = | Bulk Modulus Saturated Rock |
| $K_{fluid}$ = | Bulk Modulus Fluid |
| $K_s$ = | Bulk Modulus Rock Matrix |
| $G_{dry}$ = | Shear Modulus Dry Rock |
| $G_{Sat}$ = | Shear Modulus Saturated Rock |
| $\rho_{sat}$ = | Density Saturated Rock |
| $I_P$ = | Seismic Impedance |
| $\nu$ = | Poisson's Ratio |
| $\phi$ = | Porosity |
| $\phi_c$ = | Critical Porosity |
| $S_w$ = | Water Saturation |
| M = | Dynamical Model Forward Operator |
| $\eta$ = | Noise |
| $\bar{x}$ = | Ensemble Average |
| $\hat{P}$ = | Covariance Matrix |
| $\hat{K}$ = | Kalman Gain |
| H = | Linear Measurement Operator |

History Matching

Figure 3:
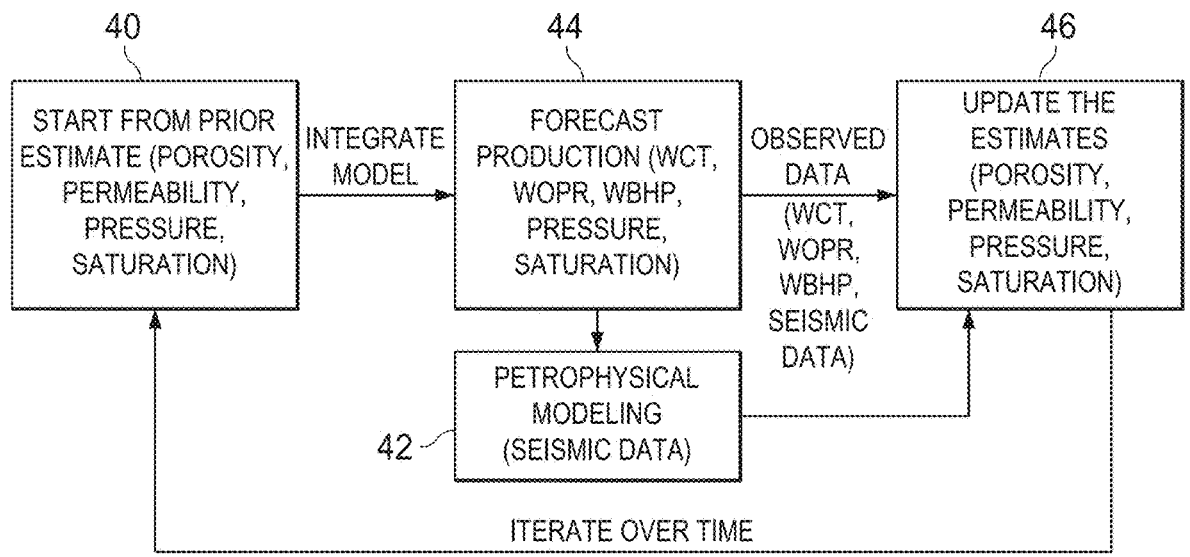
FIG. 3 is a schematic diagram of history matching of reservoir production and time-lapse seismic data.

A high level version of the workflow for history matching of production and time lapse data according to the present invention is shown in FIG. 3. The processing is an iterative process that evolves in time as more information about reservoir production over time becomes available.

Figure 5:
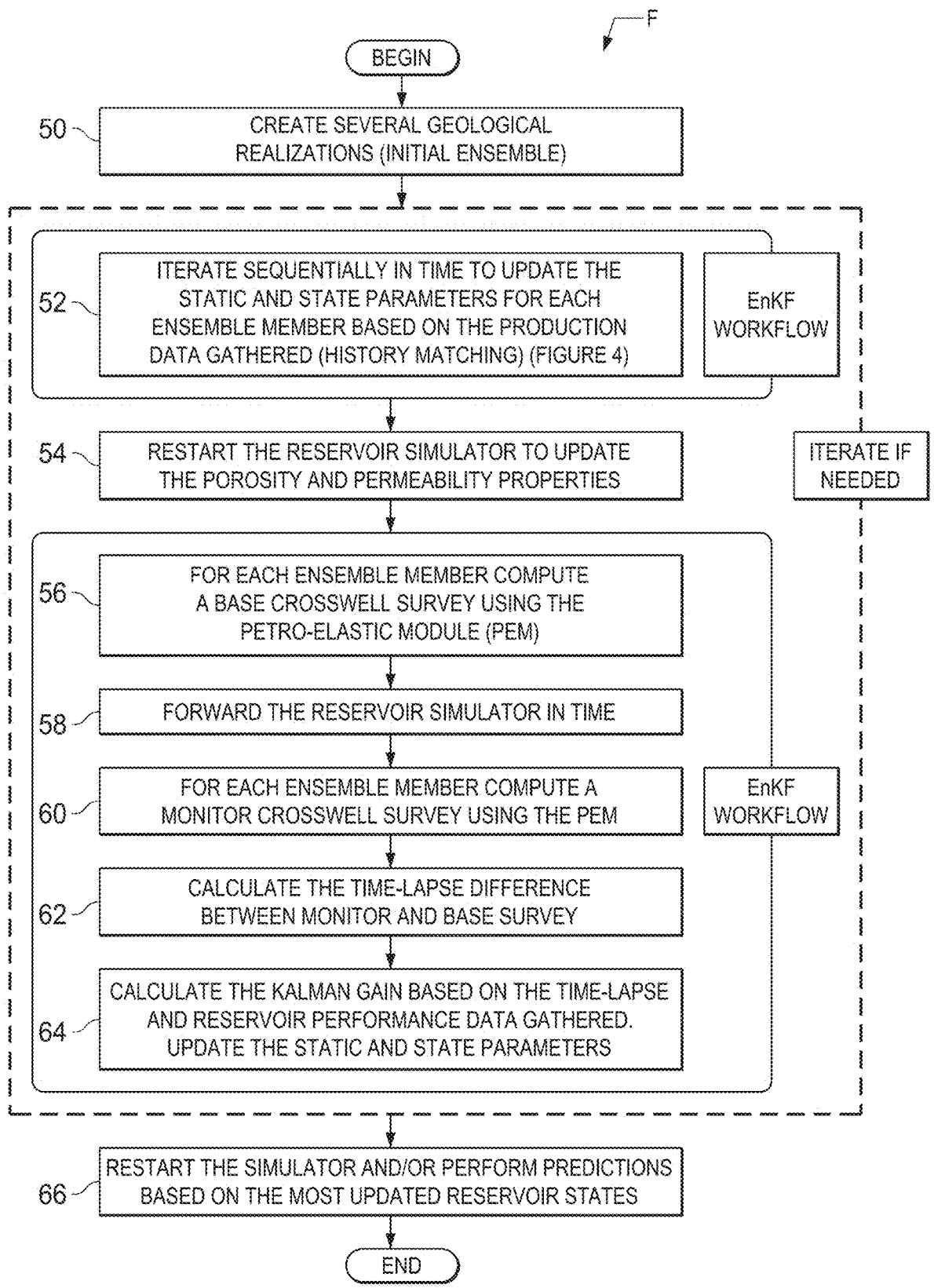
FIG. 5 is a functional block diagram of a flow chart of data processing steps for history matching of time-lapse crosswell seismic data using ensemble Kalman filtering according to the present invention.

The first step in this workflow as indicated by step 40 is the utilization of the previous parameters and states estimates (porosity, permeability, saturation and pressure) to perform the reservoir simulations, i.e., a set of reservoir models is established. A crosswell baseline survey is acquired in the manner described above regarding FIGS. 1 and 2 is stored for future use. Then the simulations are forwarded in time to predict future reservoir performance as indicated by step 44. Based on the most updated reservoir states at the end of the predicted period (saturation and pressure) and the reservoir parameters (porosity and saturation) a monitor survey is computed as indicated by step 42 also in the manner described above regarding FIGS. 1 and 2. The time-lapse difference (difference between the monitor and the base survey) is then computed and used side by side with the predicted reservoir performance (WCT, WOPR, WBHP) during step 46 to update the earlier reservoir model estimates, as well as to serve as a starting point for the next time iteration of history matching. The workflow is shown in more details as a flow chart F in FIG. 5 and described below.

The history matching process is performed by the data processing system D (FIG. 6) operating according to the present invention. To efficiently incorporate crosswell data in the reservoir history matching workflow three components of the processing done by the data processing system D are utilized, as will be described: a Reservoir Simulator R, a Petro-Elastic Module M and a History Matching Module H.

The present invention provides quantitative incorporation of the production and time-lapse dataset in the history matching process. With the present invention, an automated history matching tool incorporating Ensemble Kalman Filtering is provided so that better estimates porosity and permeability fields are available for the history matching process.

The History Matching Module H is the primary component for processing according to the present invention. The History Matching Module H interacts with the Reservoir Simulator R and Petro-Elastic Module M to provide an improved history matched solution of predicted reservoir production. The History Matching Module H uses several geological realizations to account for the uncertainties in the initial model through a probabilistic approach.

A baseline or base crosswell survey is initially acquired before production is begun in the reservoir as indicated at step 42 (FIG. 3), and subsequent crosswell surveys performed later during production to quantify the fluid displacement in the reservoir R. The time-lapse difference (difference between the initial or monitor survey and the subsequent ones) is used by the History Matching Module H to improve the quality of the match between actual production and reservoir simulation, and thus reduce the uncertainty in the porosity and permeability fields.

With the present invention, fluid displacement information is provided as a result of the processing from time-lapse data at a fraction of the current 4D data acquisition cost. Further, quantitative use of crosswell time-lapse velocity data mapped by a crosswell tomography and assimilated is provided using the EnKF filtering, as will be discussed, during processing as a substitute for 4D seismic.

Processing Analytics

The methodology of the present invention modifies the Petro-Elastic Module M and the History Matching Module H of the data processing system D. The Gassmann's equations in a conventional Petro-Elastic Module M are replaced according to the present with more representative formulas to predict the seismic impedance at higher frequencies. These formulas are Biot's velocity model and or the viscoelasticity model. The Petro-Elastic Module M is used to predict the seismic impedance and/or velocity of the grid cells of the reservoir being imaged by the crosswell tomography. The predicted values of seismic impedance or velocity, or both, are based on the current simulation properties (porosity, pressure, fluid content, density, saturation and the like) of the reservoir as a result of step 44.

In the History Matching Module H, the time-lapse data attribute difference for each grid cell within the region being imaged is assimilated using the Ensemble Kalman Filter technique. Ensemble Kalman Filtering is a Bayesian filtering technique in which an ensemble of geological realizations is updated as data becomes available leading to improved estimates of the initial conditions (in this case porosity and permeability). By using production and crosswell data together to improve the porosity and permeability estimates, comparable results can be obtained to those from conventional history matching of production and usually unavailable and more expensive 4D seismic data.

The Petro-Elastic Module M describes the rock physics which essentially represent the link between reservoir engineering and geophysics, connecting seismic data to the presence of in situ hydrocarbons and to reservoir characteristics. The model utilized in the Petro-Elastic Module M is composed of a set of equations used to calculate bulk modulus, P and S impedance from simulated pressure, fluid saturation, porosity and fluid content data.

The most general equations are the Batzle and Wang equations for the fluid properties and the Gassmann's equations for rock properties. These relations predict elastic properties of saturated porous medium from simulated fluid and static rock properties creating a bridge between fluid flow and wave propagation domains. The most widely used method for determining the effects of production induced fluid change is the Gassmann substitution method described by Equations (12) and (13) below. The Gassmann substitution method predicts the increase in the effective bulk modulus $K_{Sat}$ and shear modulus of the saturated rock $G_{sat}$ based on the porosity φ and bulk modulus of the dry rock $K_{dry}$, fluid $K_{fluid}$, effective density $\rho_{sat}$, rock matrix $K_S$ and shear modulus of the dry rock $G_{dry}$.

However, as explained above, the Gassman fluid displacement model need not be used with the present invention. Rather, it has been found that the Biot velocity model may be used and take advantage of the data available at higher frequencies from crosswell seismic surveys according to the present invention.

As explained by Mavko, G., Mukerji, T., Dvorkin, J. 2009, *The Rock Physics Handbook: Tools For Seismic Analysis Of Porous Media*, Cambridge University Press, Biot modeling derives the theoretical formulas for predicting velocities changes in saturated rocks. This formulation incorporates some but not all the mechanisms of viscous and inertial interaction between the pore fluid and the mineral matrix of the rock. In contrast to Gassmann's equations, the Biot velocity model predicts frequency dependent velocity components, while Gassmann modeling predicts only the low frequency component.

The equations describing Biot's model are given by:

$$V_{P(fast,slow)} = \left[ \frac{\Delta \pm [\Delta^2 - 4S(PQ - R^2)]^{\frac{1}{2}}}{2S} \right]^{1/2} \quad \text{Equation (1)}$$

$$V_S = \left( \frac{G_{dry}}{\rho - \phi \rho_{fl} \alpha^{-1}} \right) \quad \text{Equation (2)}$$

$$\Delta = P\rho_{22} + R\rho_{11} - 2Q\rho_{12} \quad \text{Equation (3)}$$

$$P = \frac{(1-\phi)\left(1-\phi-\frac{K_{dry}}{K_S}\right)K_S + \phi \frac{K_S K_{dry}}{K_{fluid}}}{1-\phi-\frac{K_{dry}}{K_S}+\phi\frac{K_S}{K_{fluid}}} \quad \text{Equation (4)}$$

$$Q = \frac{\left(1-\phi-\frac{K_{dry}}{K_S}\right)\phi K_S}{1-\phi-\frac{K_{dry}}{K_S}+\phi\frac{K_S}{K_{fluid}}} \quad \text{Equation (5)}$$

$$R = \frac{\phi^2 K_S}{1-\phi-\frac{K_{dry}}{K_S}+\phi\frac{K_S}{K_{fluid}}} \quad \text{Equation (6)}$$

$$S = \rho_{11}\rho_{22} - \rho_{12}^2 \quad \text{Equation (7)}$$

$$\alpha = 1 - r\left(1-\frac{1}{\phi}\right) \quad \text{Equation (8)}$$

$$\rho_{11} = (1-\phi)\rho_0 - (1-\alpha)\phi\rho_{fl} \quad \text{Equation (9)}$$

$$\rho_{22} = \alpha\phi\rho_{fl} \quad \text{Equation (10)}$$

$$\rho_{12} = (1-\alpha)\phi\rho_{fl} \quad \text{Equation (11)}$$

where $K_{dry}$ is the effective bulk modulus of the rock frame (dry frame) and $G_{dry}$ the shear modulus, $K_{fluid}$ is the bulk modulus of the pore fluid, $K_S$ is the bulk modulus of the rock mineral, $\rho_0$ is the mineral density, $\rho_{fl}$ the fluid density, r is a geometrical factor associated with the shape of the pores and a is a parameter accounting for the rock and fluid coupling, called tortuosity. The fast high frequency wave is most easily observed in the lab and in the field it represents the compressional body wave.

Gassmann's equations agree with Biot's formulation for the low frequency case. The Gassmann's equations are:

$$K_{sat} = K_{dry} + \frac{\left(1-\frac{K_{dry}}{K_S}\right)^2}{\frac{\phi}{K_{fluid}}+\frac{1-\phi}{K_S}-\frac{K_{dry}}{K_S^2}} \quad \text{Equation (12)}$$

$$G_{sat} = G_{dry} \quad \text{Equation (13)}$$

$$V_P = \left[\frac{K_{sat}+\frac{4}{3}G_{sat}}{\rho_{sat}}\right]^{1/2} \quad \text{Equation (14)}$$

$$I_P = \rho_{sat}V_P \quad \text{Equation (15)}$$

Ensemble Kalman Filtering

To provide better estimates of porosity and permeability the initial ensemble previously created is conditioned according to the present invention with historical data and model dynamics over time. This is done using Ensemble Kalman filtering.

The Ensemble Kalman Filtering (EnKF) according to the present provides a set of geological realizations which are generated to take in account the uncertainties in the geological model. This set of realizations is forwarded in time and corrected dynamically as production and time-lapse data becomes available. For each realization, the predicted reservoir performance and time-lapse response is generated as the output of the Reservoir Simulator Module R and the Petro-Elastic Module M. The predicted reservoir performance and time-lapse response is used during the EnKF processing to estimate a covariance matrix. The production data (true reservoir performance) and time-lapse data obtained from the field are used to correct states of the realizations as they are formed. Consequently the forecast values generated by these realizations become closer to the observed values.

The ensemble Kalman filter (EnKF) was first introduced by Evensen. Evensen, G., *Sequential Data Assimilation With A Nonlinear Quasi-Geostrophic Model Using Monte Carlo Methods To Forecast Error Statistics*, Journal of Geophysical Research: Oceans (1978-2012), 1994, 99(C5): p. 10143-10162. EnKF's are Monte Carlo based techniques that stochastically generate models which are integrated in time to estimate the prior probability density functions (or pdfs). What is known as the Bayes rule is then used to update the prior pdf to the posterior pdf with most recent data. This updating can be implemented independently of a reservoir simulator with reasonable computational requirements, making it an appealing choice for this reason. This methodology can be successfully applied to history matching, producing promising results, often superior as described below to those obtained with conventional history matching methods.

The Ensemble Kalman filter (EnKF) has an additional advantage. By generating an ensemble of realizations and propagating them in time, an error estimate about the forecast can be obtained providing additional information to the decision maker.

The EnKF uses a sample or ensemble of state vectors, Equation (16), where $N_e$ denotes the number of ensemble members. At every forecast step, all ensemble members are integrated forward in time with the reservoir model represented by Equation (17). The state estimate and the associated covariance matrix are respectively estimated using Equation (18) and Equation (19).

$$\{x^i, = 1, 2, \ldots, N_e\} \quad \text{Equation (16)}$$

$$x_k^{f,i} = M_{k-1,k}(x_{k-1}^{a,i}) + \eta_k^i \quad \text{Equation (17)}$$

$$\overline{x}_k^f = \frac{1}{N_e}\sum_{i=1}^{N_e} x_k^{f,i} \quad \text{Equation (18)}$$

$$\hat{P}_k^f = \frac{1}{N_e-1}\sum_{i=1}^{N_e}(x_k^{f,i}-\overline{x}_k^f)(x_k^{f,i}-\overline{x}_k^f)^T \quad \text{Equation (19)}$$

The sample covariance can be written as in Equation (20), where the $i^{th}$ column of $X_k^f$ is $$(N_e-1)^{-\frac{1}{2}}(x_k^{f,i}-\overline{x}_k^f).$$

The analysis step is performed using the linear Kalman Filter (KF) update Equation (21) where $\hat{K}_k$ is the ensemble-based approximate Kalman gain at $t_k$, $y_k^i$ is the observation perturbed with noise sampled from the distribution of the observational error given by Equation (22).

$$\hat{P}_k^f = X_k^f(X_k^f)^T \quad \text{Equation (20)}$$

$$X_k^{a,i} = X_k^{f,i} + \hat{K}_k[y_k^i - H_k x_k^{f,i}] \quad \text{Equation (21)}$$

$$\hat{K}_k = X_k^f(H_k X_k^f)^T[(H_k X_k^f)(H_k X_k^f)^T + R_k]^{-1} \quad \text{Equation (22)}$$

The analysis state and its covariance matrix are then expressed by Equation (23) and Equation (24), respectively.

$$\overline{x}_k^a = \frac{1}{N_e}\sum_{i=1}^{N_e} x_k^{a,i} \quad \text{Equation (23)}$$

$$\hat{P}_k^a = \frac{1}{N_e-1}\sum_{i=1}^{N_e}(x_k^{a,i}-\overline{x}_k^a)(x_k^{a,i}-\overline{x}_k^a)^T \quad \text{Equation (24)}$$

Porosity, permeability, saturation and pressure are included in the state vector during processing according to the present invention. Porosity and permeability are static variables while pressure and saturation are dynamic (produced by the reservoir simulator in runtime). The assimilated data is composed of production and seismic data obtained from the original model perturbed with Gaussian errors.

Processing Methodology

A flow chart F (FIG. 5) illustrates the basic computer processing sequence used in the history matching process according to the present invention and the computational methodology taking place during a typical embodiment of a history matching of time-lapse crosswell data using Ensemble Kalman filtering according to the present invention.

During step 50, an initial estimate of several possible realizations of a reservoir model is formed. Next, during step 52, as part of the history matching with Ensemble Kalman filtering processing, the reservoir model realizations formed during step 50 are iterated sequentially based on the production data gathered since the last iteration. This is a conventional history match based on production data alone as illustrated in FIG. 4.

Figure 4:
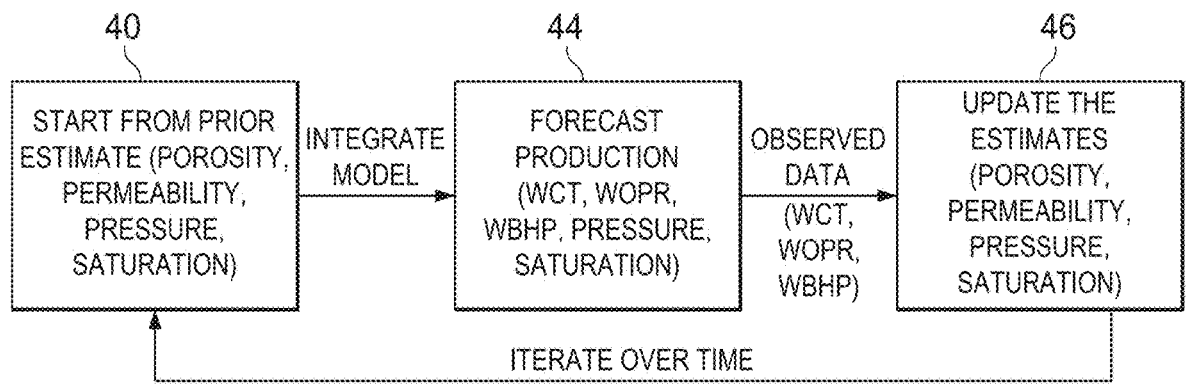
FIG. 4 is a schematic diagram of history matching of time-lapse crosswell seismic data using ensemble Kalman filtering according to the present invention.

The history match based on production data alone of FIG. 4 includes processing much like that described in FIG. 3, except no time lapse data is involved. Accordingly, the establishment of reservoir models step of FIG. 4 bears a like reference numbered 40 to the comparable step of FIG. 3 described above. Similarly, the forecasting or prediction step 44 of FIG. 4 bears a like reference to the comparable step of FIG. 3 described above as is also the case for the step 46 of updating the reservoir model estimates.

During step 54, the reservoir simulation module R is restarted and the estimates of porosity and permeability are updated based on the results of step 52. In step 56, a set of base crosswell survey data is computed for each ensemble member using the Petro-Elastic module M with the updated porosity and permeability properties resulting from step 54. This dataset as well as the observed field data (time-lapse crosswell surveys) are stored in memory.

During step 58, the Reservoir Simulator Module R is advanced in until the moment that the monitor survey was collected in the field. During step 60, a monitor crosswell survey is computed for the present reservoir simulator time step for each ensemble member. Step 62 involves determining a time-lapse difference between the monitor crosswell seismic survey and the base crosswell seismic survey determined during step 60. The observed and simulated time-lapse differences are incorporated in the processing methodology as the relative difference between base and monitor survey as expressed by Equation (25).

$$\text{Time - lapse difference (\%)} = \frac{100(\text{Monitor} - \text{Base})}{\text{Base}} \quad \text{Equation (25)}$$

During step 64, the time-lapse difference and the predicted reservoir performed simulated for each ensemble member is then incorporated in the history matching loop by means of the Ensemble Kalman Filter (EnKF).

The observed data (reservoir performance and time-lapse data) is perturbed during step 64 with Gaussian errors by a user specified standard deviation (STD). The square of these same values were used as given variances of the observational errors in the computation of the gain matrix in Equation (22), which were assumed uncorrelated (i.e., R diagonal). Then the Kalman gain matrix is computed taking as input the predicted reservoir performance (WCT, WBHP, WOPR), time-lapse difference for each ensemble member and covariance matrix as expressed by Equation (22). The Kalman gain is them used to update the state vector by means of the Equation (21).

During step 66, the Reservoir Simulator Module R may be restarted, or predictions of reservoir production can be made by the simulator based on the most recent reservoir states and the updated Petro-Elastic Model M. Data generated during step 66 is then stored in memory of the data processing system D and also available for display and analysis by users of the data processing system D.

Data Processing System

Figure 6:
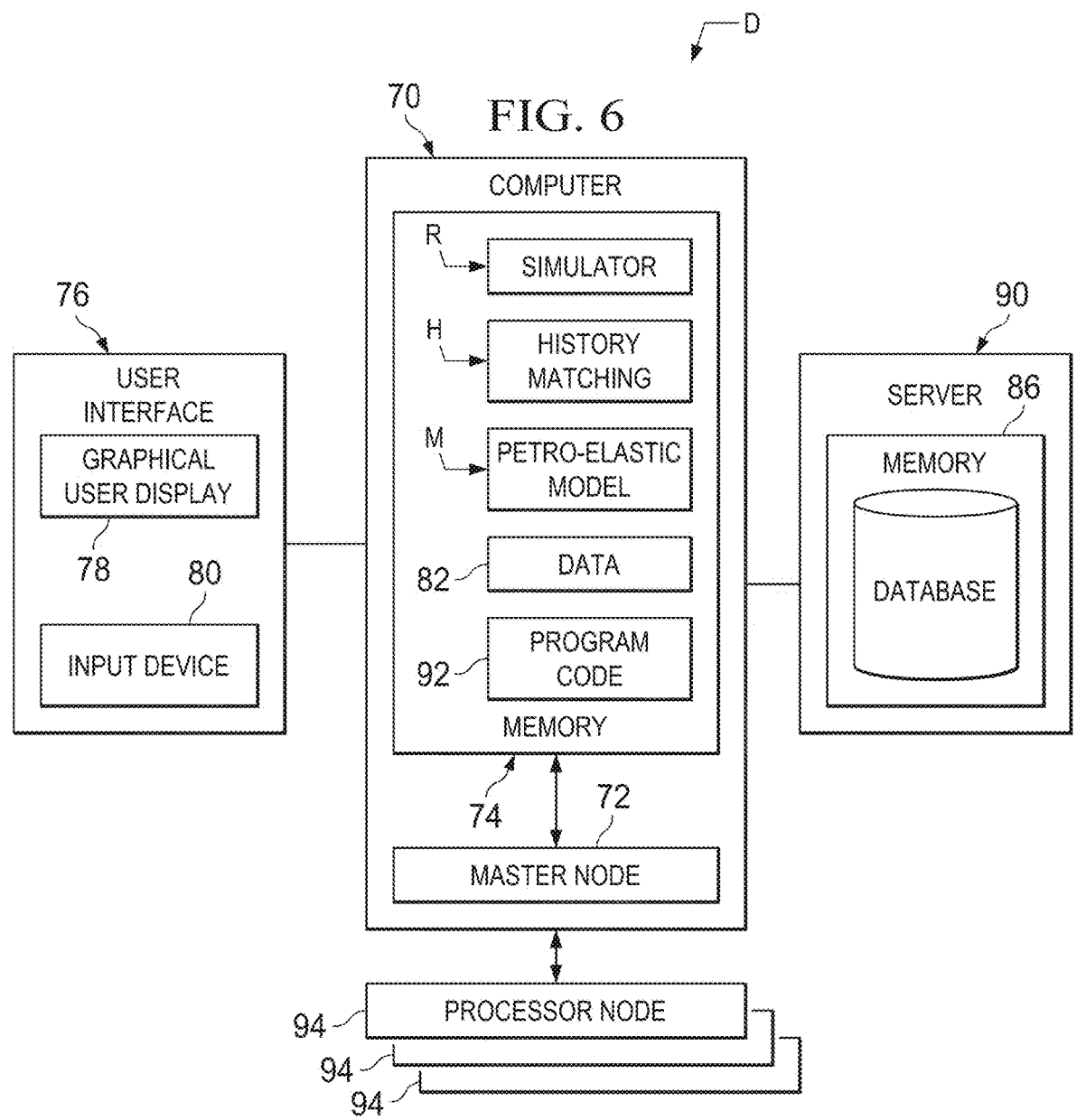
FIG. 6 is a schematic diagram of a computer network for history matching of time-lapse crosswell data using ensemble Kalman filtering according to the present invention.

As illustrated in FIG. 6, the data processing system D includes a computer 70 having a master node processor 72 and memory 74 coupled to the processor 72 to store operating instructions, control information and database records therein. The data processing system D may be a multicore processor with nodes such as those from Intel Corporation or Advanced Micro Devices (AMD), an HPC Linux cluster computer or a mainframe computer of any conventional type of suitable processing capacity such as those available from International Business Machines (IBM) of Armonk, N.Y. or other source. The data processing system D may also be a computer of any conventional type of suitable processing capacity, such as a personal computer, laptop computer, or any other suitable processing apparatus. It should thus be understood that a number of commercially available data processing systems and types of computers may be used for this purpose.

The processor 72 is accessible to operators or users through user interface 76 and is available for displaying output data or records of processing results obtained according to the present invention with an output graphic user display 78. The output display 78 includes components such as a printer and an output display screen capable of providing printed output information or visible displays in the form of graphs, data sheets, graphical images, data plots and the like as output records or images.

The user interface 76 of computer 70 also includes a suitable user input device or input/output control unit 80 to provide a user access to control or access information and database records and operate the computer 70. Data processing system D further includes a database 82 of reservoir data and crosswell survey data stored in computer memory, which may be internal memory 74, or an external, networked, or non-networked memory as indicated at 86 in an associated database server 90.

The data processing system D includes program code 92 stored in non-transitory memory 94 of the computer 70. The program code 92 according to the present invention is in the form of computer operable instructions causing the data processor 70 to perform history matching of time-lapse crosswell data using ensemble Kalman filtering according to the present invention in the manner that has been set forth.

The computer memory 74 also contains stored computer operating instructions in the non-transitory form of History Matching Module H, the Petro-Elastic Module M, the Reservoir Simulator Module R, and also the data from data base 82 being manipulated and processed by the processor 72.

It should be noted that program code 92 may be in the form of microcode, programs, routines, or symbolic computer operable languages that provide a specific set of ordered operations that control the functioning of the data processing system D and direct its operation. The instructions of program code 92 may be stored in memory 74 of the data processing system D, or on computer diskette, magnetic tape, conventional hard disk drive, electronic read-only memory, optical storage device, or other appropriate data storage device having a computer usable non-transitory medium stored thereon. Program code 92 may also be contained on a data storage device such as server 90 as a non-transitory computer readable medium, as shown.

The data processing system D may be comprised of a single CPU, or a computer cluster as shown in FIG. 6, including computer memory and other hardware that makes it possible to manipulate data and obtain output data from input data. A cluster is a collection of computers, referred to as nodes, connected via a network. Usually a cluster has one or two head nodes or master nodes 72 that are used to synchronize the activities of the other nodes, referred to as processing nodes 94. The processing nodes 94 all execute the same computer program and work independently on different segments of the grid which represents the reservoir.

Experimental Data

The following example based on synthetic data was built to compare the potential of the method when compared with well-established methodologies (4D seismic). An identical twin experiment intended for history matching purposes was used for this purpose.

The objective of this study is to reduce uncertainties in the cumulative production forecast and duration of the production plateau. The uncertainty in these circumstances is defined as the ensemble spread in the cumulative production curve and duration of the production plateau. RRMS error reductions for porosity and permeability are also calculated to investigate the quality of the estimates.

A two dimensional domain model formed of one horizontal layer of 40 by 40 grid cells of dimension 50 by 50 meters. The thickness of the layer is 25 meters. The reservoir is composed of unconsolidated sandstone. The model uses water flooding as recovery strategy. The injection is controlled by voidage replacement. A five spot pattern comparable to that shown in FIG. 1 is used to produce the reservoir (four producers in each one of the corners and one injector in the center).

Only two phases are considered, water and oil. The initial conditions are specified as equilibrium conditions for the simulator. Therefore, the simulator calculates the initial pressure distribution based on the pressure and the depth of the datum and oil contacts. The initial saturation is assumed to be constant and equal to the connate water along the entire domain. The simulated fluid is treated as dead oil.

Figure 9:
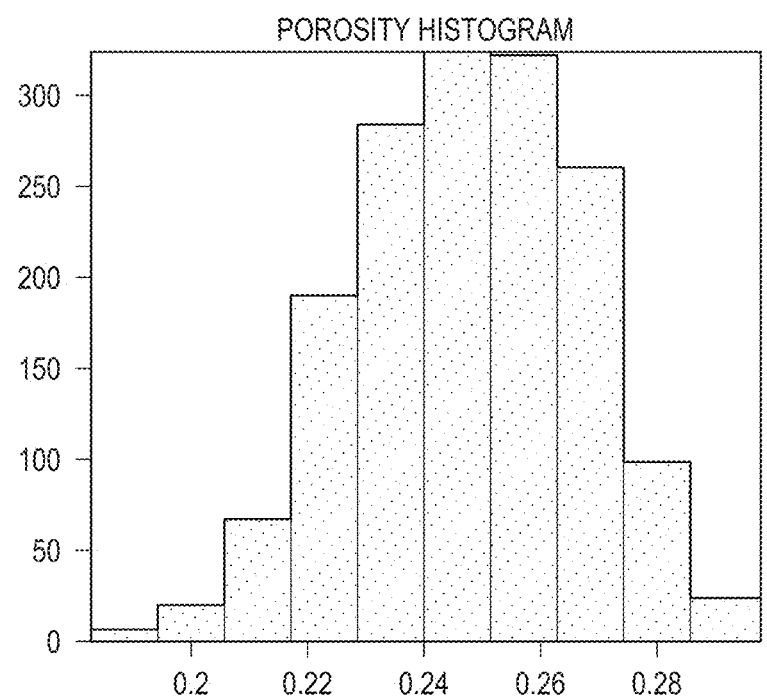
FIG. 9 is a histogram for the porosity model of FIG. 7.
Figure 10:
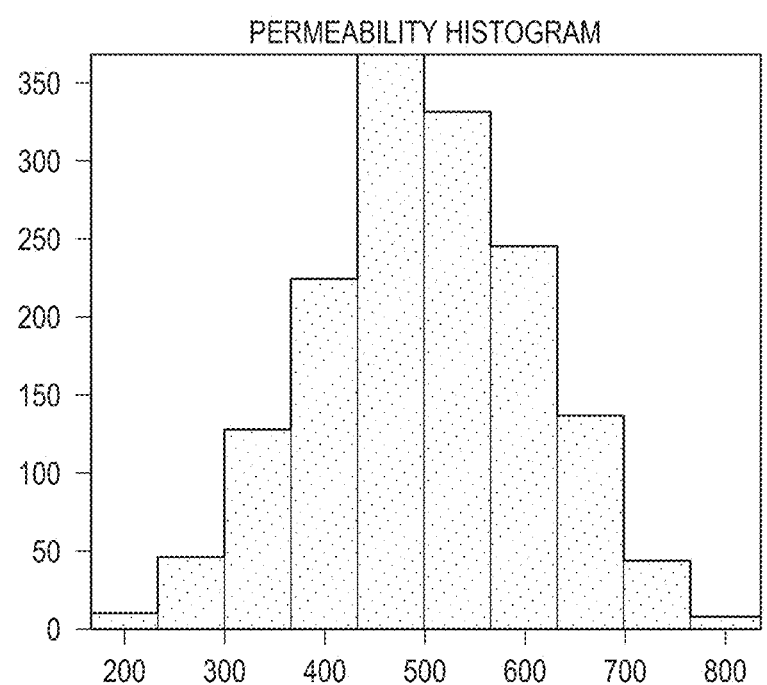
FIG. 10 is a histogram for the permeability model of FIG. 8.

The geological properties (permeability and porosity) were populated geostatistically as seen in FIGS. 7 and 8. A high porosity and a high permeability area is present as shown in FIGS. 7 and 8, respectively, in the left side of the field while a lower permeability and porosity area is present in the lower right portion of the field. The attributes are distributed approximately following a Gaussian distribution (FIGS. 9 and 10). Permeability was obtained through co-kriging using the porosity as secondary parameter. Thus a correlation between porosity and permeability is present in the geological model (FIG. 11). For this particular study MRST—(Matlab Reservoir Software Tool), an open source reservoir simulation toolbox developed by SINTEF was used.

The reservoir performance is evaluated for 16 years using numerical time steps of 30 days. The parameters used to create the true model are summarized in the Table 1.

TABLE 1

Summary Of The Properties Used To Build The Reservoir Model

| Property | Value |
| --- | --- |
| Pressure (Reference) | 30 MPa |
| Oil density | 859 Kg/m$^3$ |
| Water density | 1014 Kg/m$^3$ |
| Viscosity water | 0.4 cP |
| Viscosity oil | 0.9 cP |
| Connate water | 0.2 |
| Irreducible oil saturation | 0.2 |
| Water injection rate | 2000 m$^3$/day |
| Relative permeability | 1 |

Porosity, saturation, density of the fluids and rocks forecast by the simulator or obtained from the geological model are used to calculate seismic attributes. The petrophysical constants employed in the simulation where obtained from M. Holmes and A. Holmes (2005), *Petrophysical Rock Physics Modeling: A Comparison Of The Krief and Gassmann Equations, and Applications To Verifying and Estimating Compressional and Shear Velocities*, presented at the 46$^{th}$ Annual Logging Symposium, SPWLA 46th Annual Logging Symposium, New Orleans: Society of Petroleum Well Log Analysts. The bulk modulus of the matrix rock is $K_s$=37.9 GPa and shear modulus $G_s$=44 GPa. The bulk modulus of water and gas are $K_{water}$=3.05 GPa and $K_{oil}$=0.43 GPa respectively. The bulk and shear modulus of the dry rock $K_{dry}$, $G_{dry}$ as estimated using empirical relations according to A. Nur, G. Mavko, J. Dvorkin and D. Galmudi (1998), "*Critical Porosity: A Key To Relating Physical Properties To Porosity In Rocks*", The Leading Edge 17(3): 357-362.

$$K_{dry} = K_s\left(1 - \frac{\phi}{\phi_c}\right) \quad \text{Equation (26)}$$

$$G_{sat} = G_{dry} = G_s\left(1 - \frac{\phi}{\phi_c}\right) \quad \text{Equation (27)}$$

The bulk and shear modulus of the dry rocks set forth in Equations (26) and (27) is determined based on a linear interpolation. For sandstone accumulations the critical porosity $\varphi_c$ is 40%.

The combined effect of the rock fluids $K_{fluid}$ is given by Voigt relationship $$K_{fluid} = sK_{water} + (1-S)K_{oil} \quad \text{Equation (28)}$$

The density of the sandstone rock matrix is $\rho_{rock}$=2850 Kg/m$^3$, the densities of oil and water are respectively $\rho_{oil}$=859 Kg/m$^3$ and an $\rho_{water}$=1014 Kg/m$^3$.

The pressure dependence is not included in these relationships, as it is assumed not to vary significantly over the reservoir life span due to the voidage replacement recovery process being used to produce this reservoir. The initial pressure is 30 MPa.

Well Bottomhole pressure (WBHP), well oil production rate (WOPR) and well water (WWCT) are observed during this study every 30 days for each well in the model to mimic realistic conditions. Time-Lapse attributes are derived from reservoir properties. Data (production or time-lapse attributes) is obtained by forwarding the simulator in time. At the end of each model time step production data and/or seismic data can be provided. However, seismic data is generated only twice during the entire simulation, before the production starts and after a certain period of time, such as approximately mid-life of the production from the reservoir study model.

In actual practice, the true model is not known. It must therefore be estimated. Using a Monte Carlo approach 80 models were created to investigate the impact of uncertainties in the porosity and permeability fields in the simulations. Porosity distributions were generated using Sequential Gaussian Simulation while permeability was obtained using co-kriging. A limited number of points from the true distribution were used in the kriging setup to populate the porosity (these data points represent the log data collected at each well). To generate permeability the porosity was used as a secondary attribute in the co-kriging process.

Figure 13:
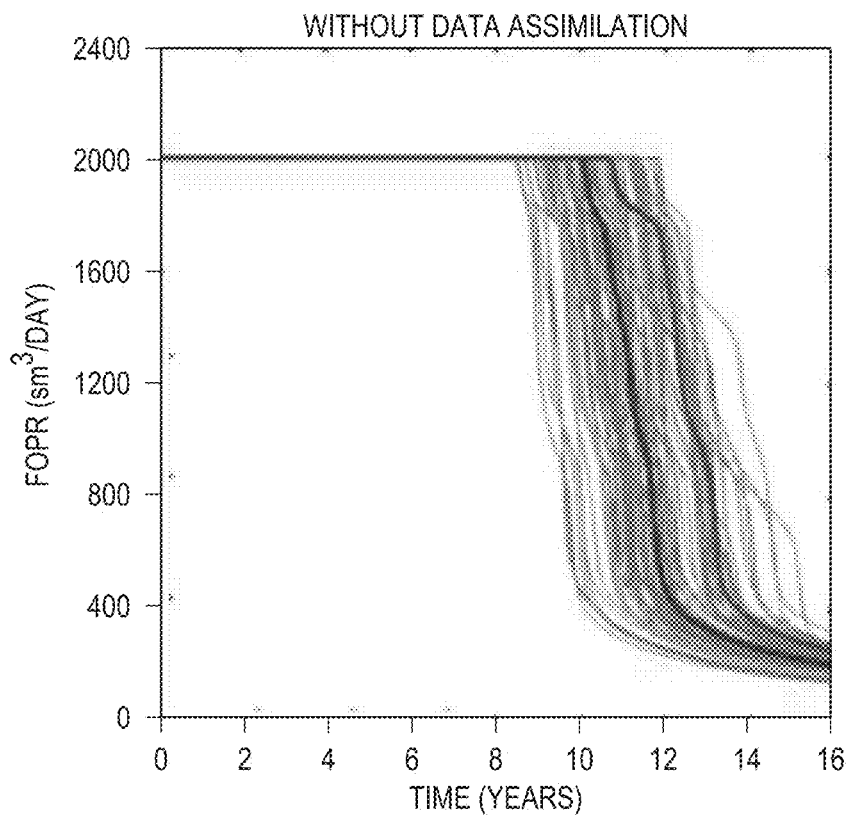
FIG. 13 is a plot of potential production plateau duration from a model reservoir for various possible porosities and permeabilities.

The impact of the uncertainties in the porosity and permeability maps are responsible for huge uncertainties in the total amount of oil that can be recovered in the field as seen in FIG. 12. FIG. 13 is a plot of forecast oil production for the models. The ensemble members are individually represented in gray. The true values are represented in red. The ensemble average is represented in blue. The P90 probability curve in magenta and the P10 in green. The uncertainty in the cumulative productions is about 11 millions of barrels of oil, which at current market prices exceeds 1 billion of dollars (FIG. 12). There is a huge uncertainty in the oil peak as well (FIG. 13). The true model peaks after 12 years of production while the uncertainty in the initial ensemble ranges from 9 to 14 years.

History Matching Production Data

The objective of this experiment is to provide a baseline for comparison. Most of the oil and gas industry still only uses production data to perform history matching, therefore a significant improvement in the history matching quality can be obtained by the inclusion of additional datasets in the history matching process.

Figure 14:
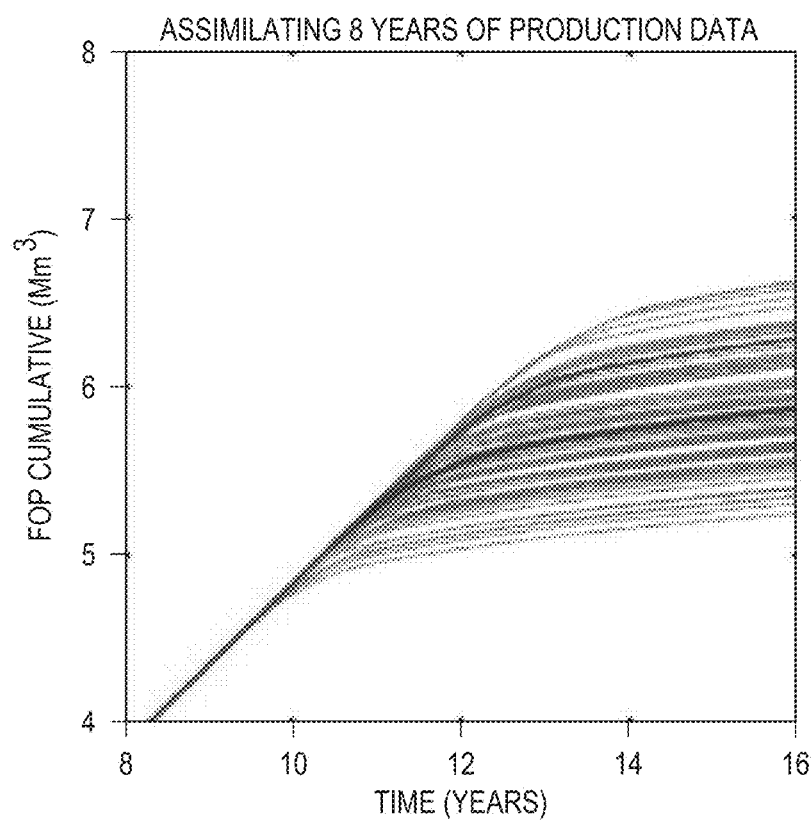
FIG. 14 is a plot showing the potential cumulative oil production from a model reservoir for various possible porosities and permeabilities based on the assimilation of production data.
Figure 15:
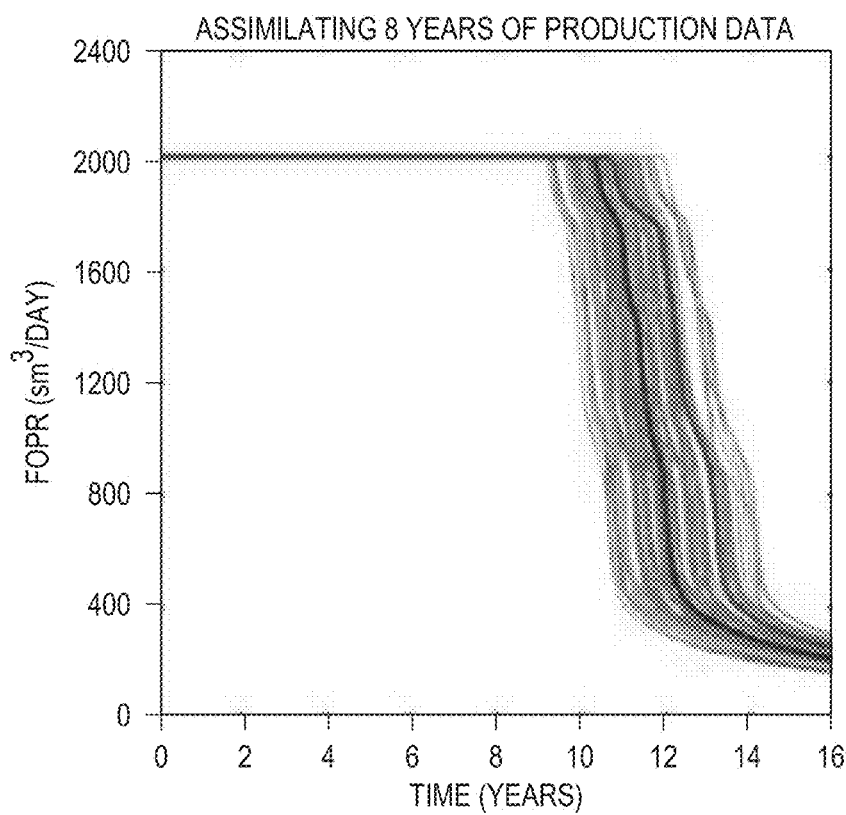
FIG. 15 is a plot showing the potential production plateau duration from a model reservoir for various possible porosities and permeabilities based on the assimilation of production data.

The initial ensemble created previously was updated sequentially using the EnKF (FIG. 4). In this experiment, 8 years of production data were history matched. The simulations are forwarded in time and production data is assimilated at the end of each assimilation time step. The obtained results are shown in FIGS. 14 and 15, where the first represents the field cumulative production and the second figure represents the field oil production rate. The ensemble mean is shown in FIGS. 14 and 15 in blue while the ensemble members are shown in grey. The true solution is shown in red. The ensemble average underestimate the cumulative production (forecast values).

The most important parameter affecting the reservoir performance in this particular scenario is thus the porosity distribution. Porosity distribution determines the initial amount of oil initially in place and its location; thus, it affects the total amount of fluids that can be recovered from this field. Permeability plays a major role to explain how the fluids move inside the field and how fast they can be recovered. But over time, permeability does not significantly affect the cumulative oil production in this study model due to the high quality sand simulated in this scenario.

Figure 16:
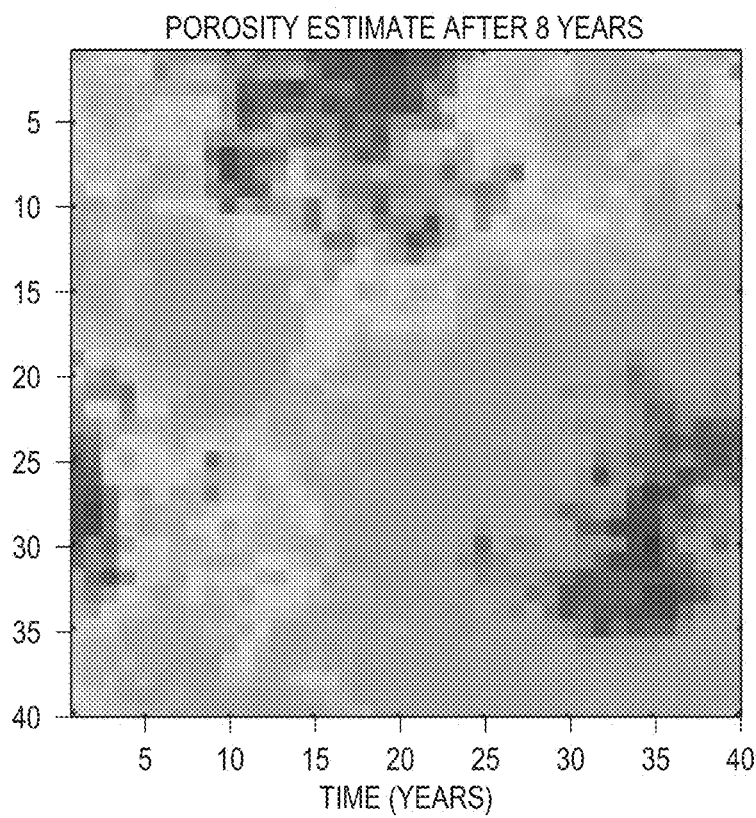
FIG. 16 is a plot of the estimated porosity distribution obtained with the assimilation of production data and in accordance with the present invention.
Figure 17:
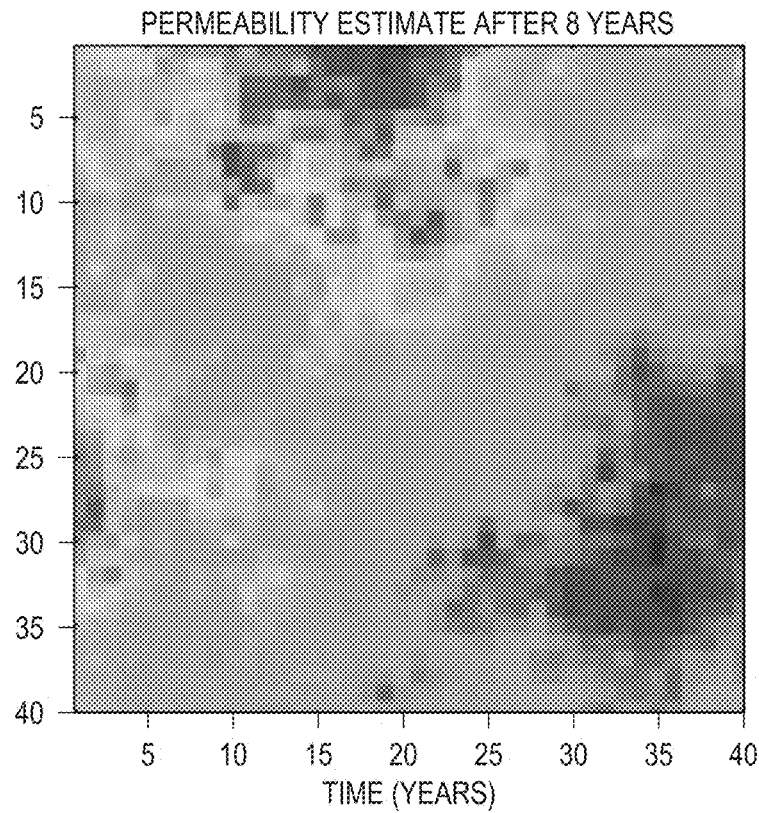
FIG. 17 is a plot of the estimated permeability distribution obtained with the assimilation of production data and in accordance with the present invention.
Figure 18:
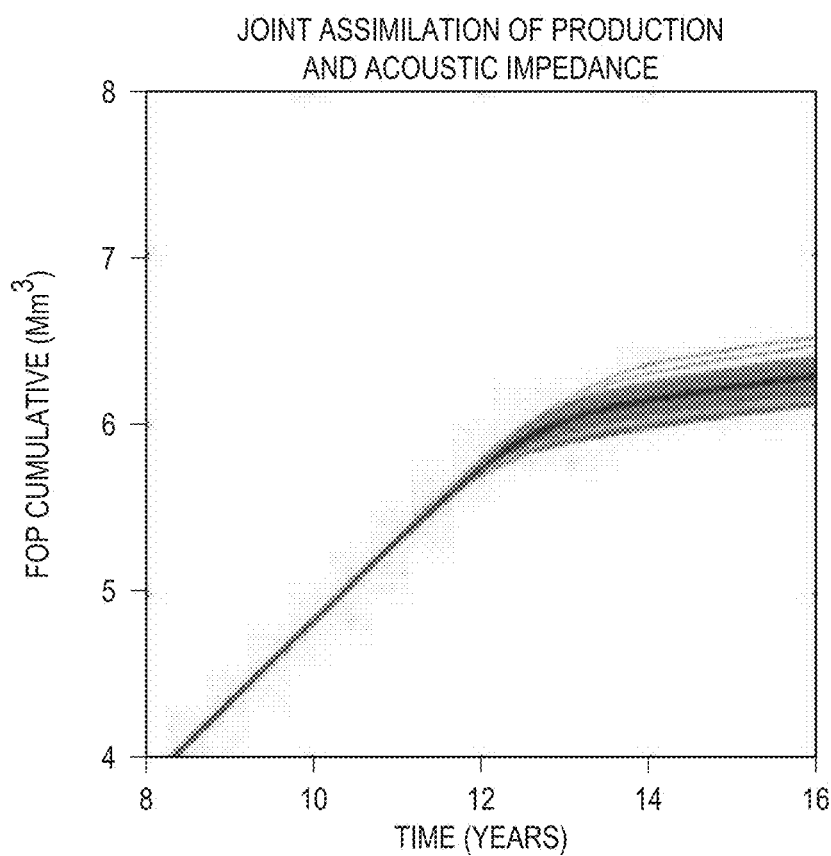
FIG. 18 is a plot showing the potential cumulative oil production from a model reservoir for various possible porosities and permeabilities based on the joint assimilation of production and time-lapse acoustic impedance data.
Figure 19:
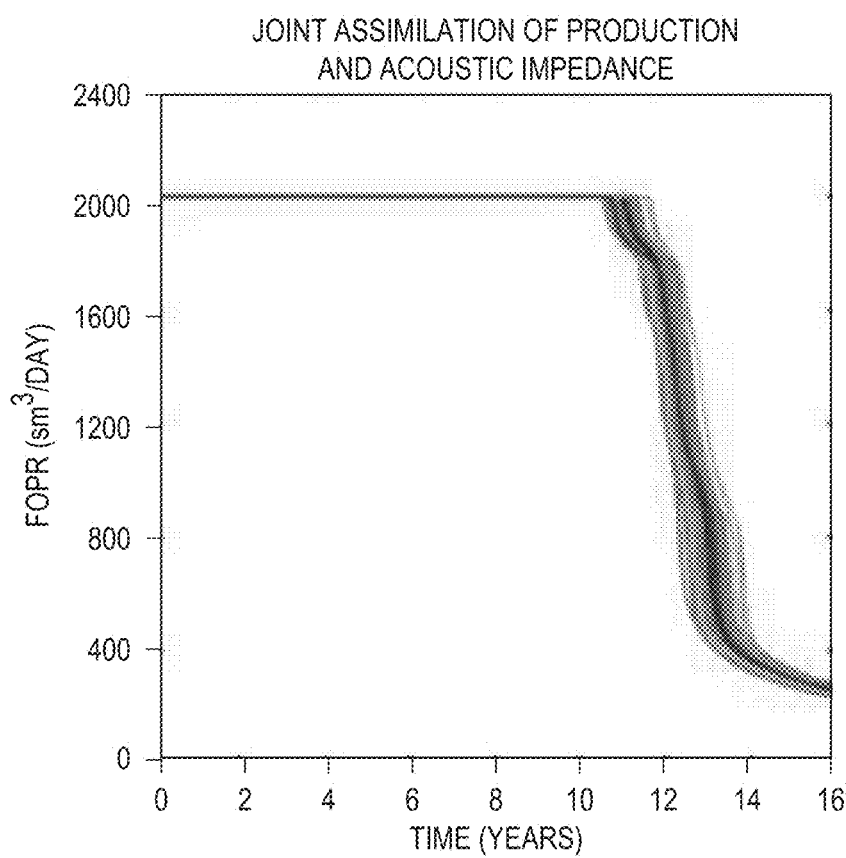
FIG. 19 is a plot showing the potential production plateau duration from a model reservoir for various possible porosities and permeabilities based on the joint assimilation of production and time-lapse acoustic impedance data.

At the end of the history matching experiment the uncertainty in the duration of the production plateau and the cumulative production is still considerable. A possibility to further improve the quality of the simulation model is the inclusion of time-lapse data in the history matching process. A qualitative comparison of the estimated porosity and permeability can be drawn from the FIGS. 16 and 17 where the estimated porosity and permeability are shown and FIGS. 7 and 8 where the real properties are shown.

Joint History Matching Production and Time-Lapse Acoustic Impedance

The state of art technique used in the industry is the utilization of production and time-lapse seismic data in the history matching process. The seismic data is acquired at surface by deploying sources and receivers in the field.

Gassmann's equations (Equation 12 and Equation 14) and Equation 15 were used to simulate the acoustic impedance at every grid cell for each of the realizations taking in account fluid displacement effects on the reservoir due to production. A base survey is performed before the production begins and a monitor survey is performed at the end of the history matching period. The relative acoustic impedance difference (Equation 25) is then assimilated in the history matching loop along with production data.

The workflow used to incorporate the seismic data into the history matching process is shown in the FIG. 3. The predicted relative difference in the time-lapse acoustic impedance due to production effects can reach up to about 5% along the production life of the reservoir far exceeding the uncertainty related with the time-lapse signal, assumed to be 2% in our simulations. This predicted time-lapse difference was then jointly assimilated with production data.

Figure 20:
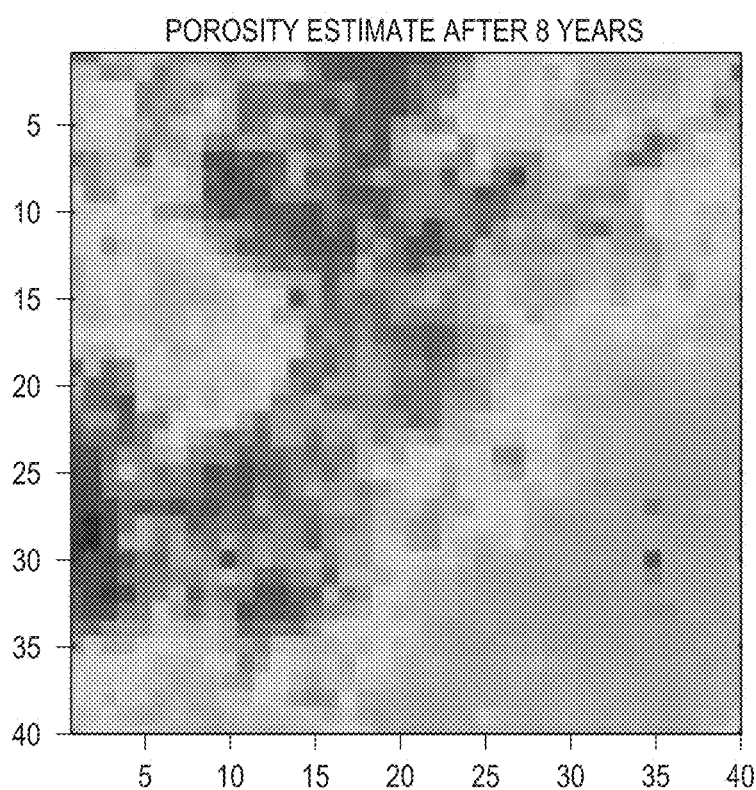
FIG. 20 is a plot of the estimated porosity distribution obtained with the assimilation of production and acoustic impedance data and in accordance with the present invention.
Figure 21:
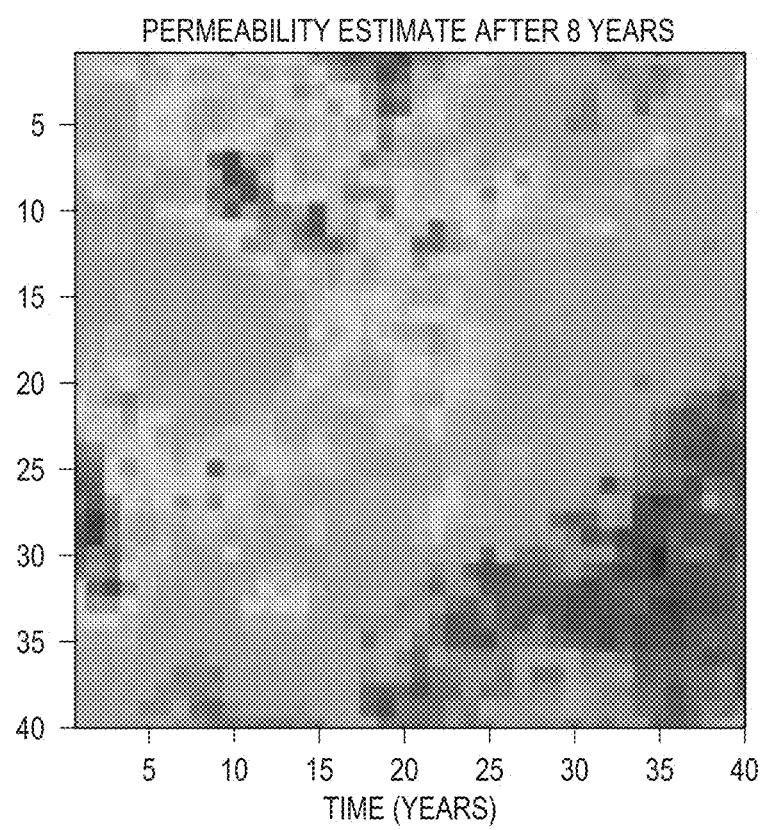
FIG. 21 is a plot of the estimated permeability distribution obtained with the assimilation of production and acoustic impedance data and in accordance with the present invention.
Figure 28:
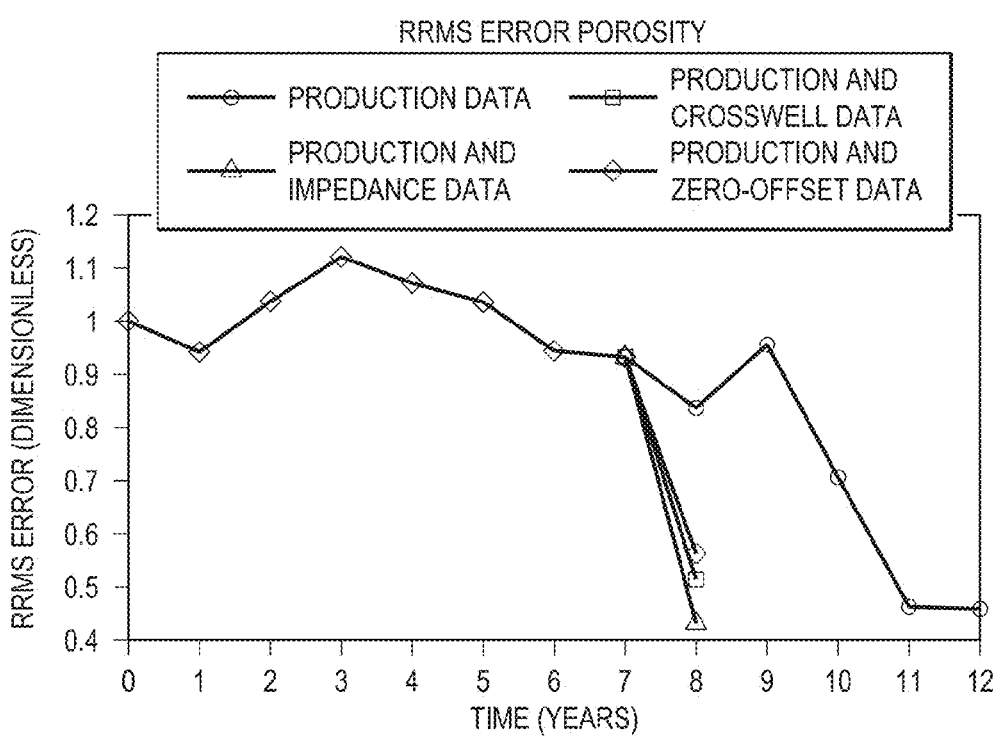
FIG. 28 is a plot of the RRMS error for the estimated porosity based on the production data, joint assimilation of production and seismic impedance data joint assimilation of production and crosswell time-lapse velocity data and in accordance with the present invention.
Figure 29:
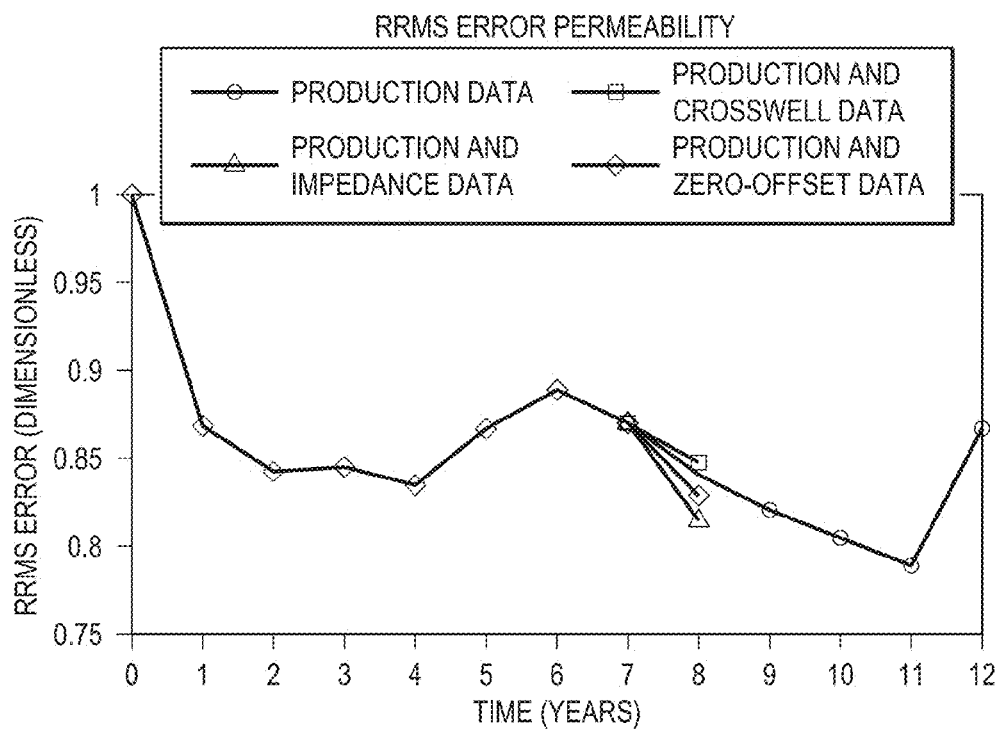
FIG. 29 is a plot of the RRMS error for the estimated permeability based on the production data, joint assimilation of production and seismic impedance data joint assimilation of production and crosswell time-lapse velocity data and in accordance with the present invention.

It was found that assimilating production data for a period of 8 years is enough to obtain reasonable results, with comparable history matching improve to those obtained assimilating production data for 12 years (FIGS. 28 and 29). The estimated porosity and permeability distributions at the end of the history matching period can be seen in the FIGS. 20 and 21. The best scenario found was to perform the second seismic survey at the end of the observed production period. By doing this the difference between two consecutive surveys will be maximized.

Joint History Matching Production and Crosswell Time-Lapse Data

The present invention provides for the use of crosswell data to map the fluid changes in the reservoir. This approach has several advantages over conventional time-lapse seismic acquisitions. The most important one is the cost to obtain the data. Running a full field survey is several times more expensive than collecting data at certain locations only. Reproducibility is also a major issue. Reproducing the acquisition setup of surface seismic surveys is challenging and can severely compromise the quality of the time-lapse data. The time-lapse crosswell data can be used in several forms under the proposed workflow, among them in the form of travel time data or in the form of acoustic attributes (as velocity and impedance for example).

Fluid displacement data can be directly obtained from the travel time of the rays between the producers and the injectors. The travel time data contains information about the water flood front movement. The same is true for the acoustic attributes (velocity and impedance).

This approach has several advantages over conventional time-lapse seismic acquisitions. The most important one it the cost to obtain the data. Running a full field survey is several times more expensive than collecting data only at certain locations. Reproducibility of earlier surface survey conditions is also a major issue. Reproducing the acquisition setup of the base survey is challenging and can severely compromise the quality of the time-lapse data obtained. The advantage of using wells as fixed points to collect data avoids this problem.

Another advantage of the present invention is the use of high frequencies to image the interwell region, which leads to higher spatial resolution. Higher frequencies can also highlight the fluid displacement effect more easily. The uncertainties in the data are much smaller. The use of crosswell tomography can provide a velocity map directly which then can be modeled using the Biot velocity model. These advantages offset the limited area coverage available with crosswell surveying.

Figure 22:
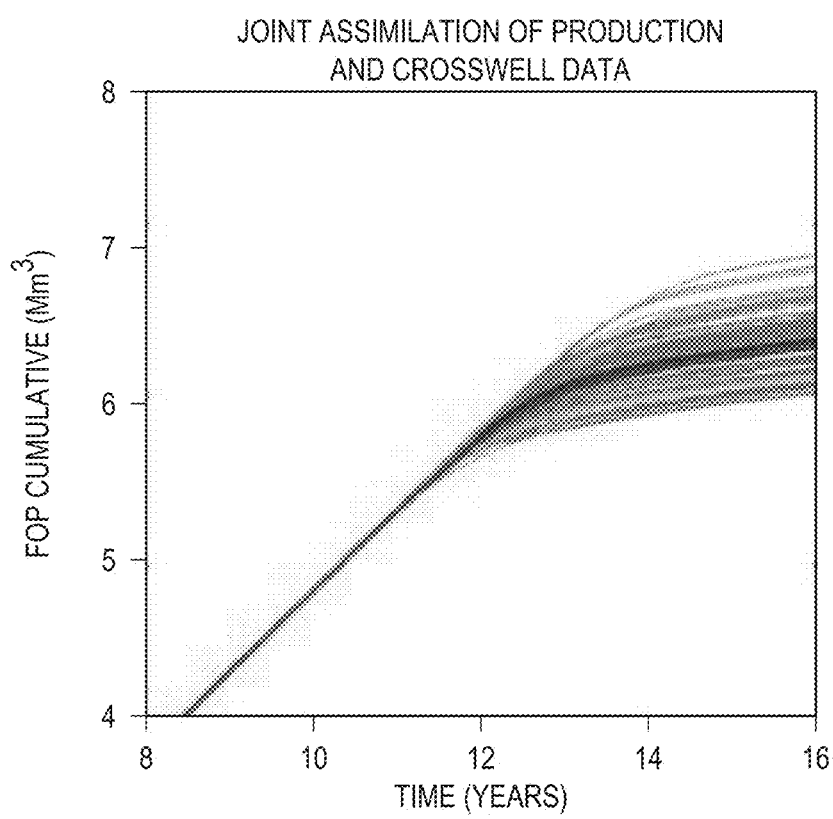
FIG. 22 is a plot showing the potential cumulative oil production from a model reservoir for various possible porosities and permeabilities based on the joint assimilation of production and time-lapse crosswell data.
Figure 23:
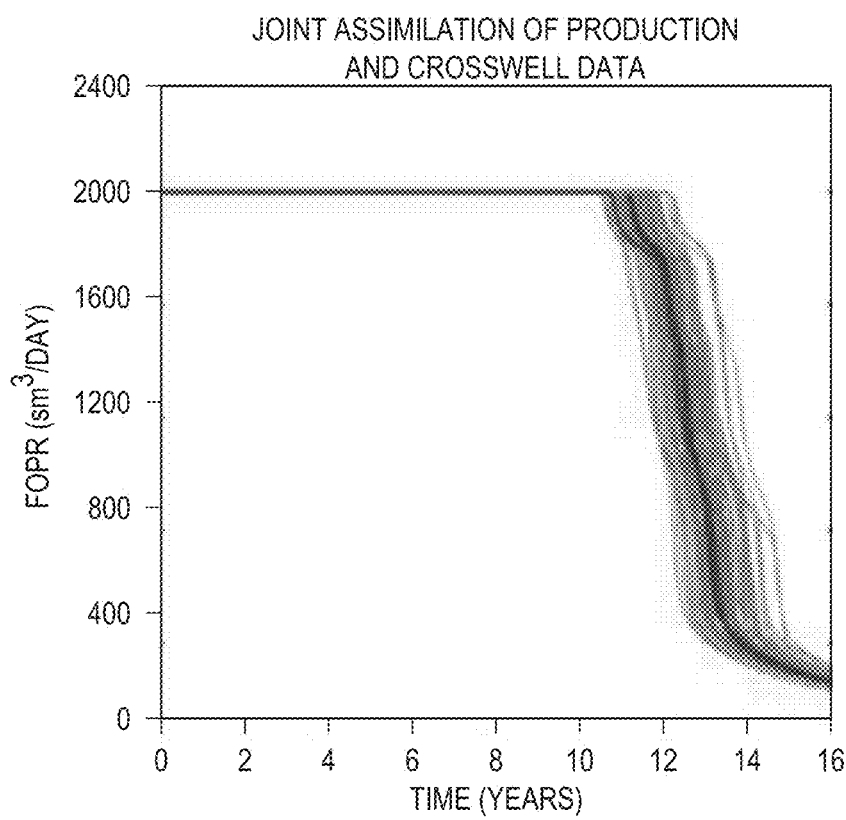
FIG. 23 is a plot showing the potential production plateau duration from a model reservoir for various possible porosities and permeabilities based on the joint assimilation of production and time-lapse crosswell data.

To illustrate the potential of this methodology we used velocity tomograms as the time-lapse data. The observed data was perturbed with Gaussian errors with zero mean and standard deviation of 2% of the signal (time-lapse difference) as described previously (Equation 25). The assimilation results are shown in FIGS. 22 and 23 where the uncertainty in the cumulative production and in the duration of the production plateau are shown respectively. A significant improvement in the quality of the estimates is obtained by the joint assimilation of production and crosswell data. The RRMS error of the estimated porosity of the joint assimilation of production and time-lapse crosswell data is comparable with the one obtained assimilating production and time lapse acoustic impedance (surface seismic) as seen in the FIG. 28.

Figure 24:
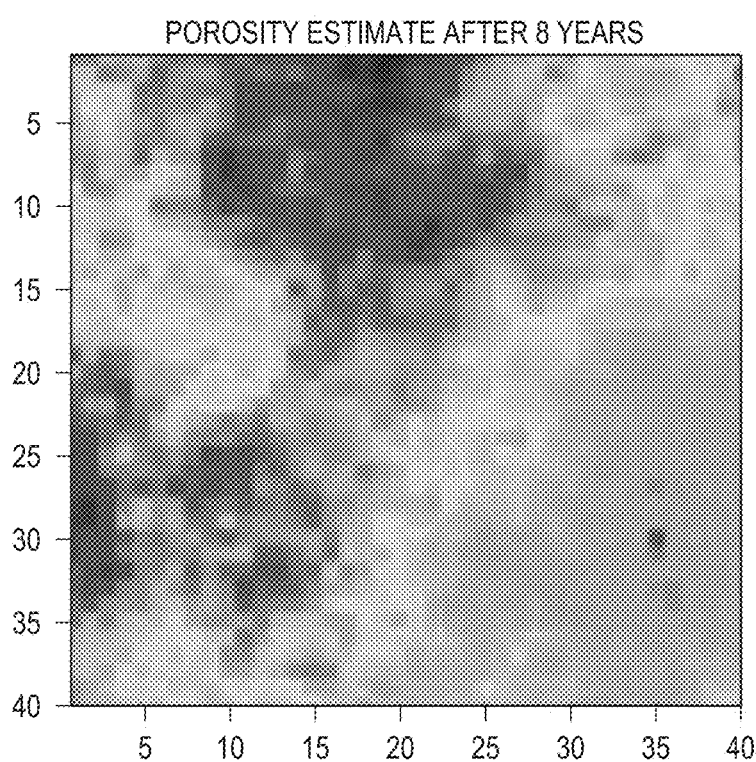
FIG. 24 is a plot of the estimated porosity distribution obtained with the assimilation of production and crosswell data and in accordance with the present invention.
Figure 25:
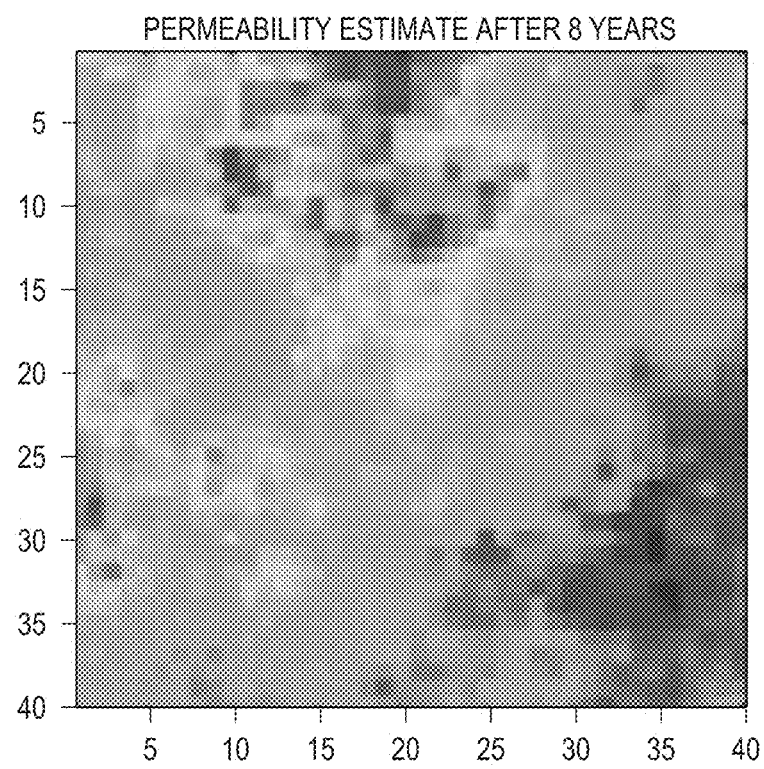
FIG. 25 is a plot of the estimated permeability distribution obtained with the assimilation of production and crosswell data and in accordance with the present invention.

A qualitative comparison of the estimated porosity and permeability can be seen in the FIGS. 24 and 25 where the estimated parameters are shown and FIGS. 7 and 8 where the real parameters are shown. A quantitative comparison can be seen in FIGS. 28 and 29. The improvement achieved by incorporating time-lapse data is noticeable. The major difference takes place in the last assimilation time step (8 years) where the time-lapse data is incorporated. The improvements in the quality of the recovered porosity and permeability as well as predicted reservoir performance put the use of production and crosswell data somewhere in between the improvements obtained by the use of production and time-lapse (surface seismic) data. It must be noticed that the proposed methodology is intended for areas that re-shooting surface seismic is not an option. Therefore the use of time-lapse data can significantly enhance the quality of the history matching process.

Significant improvements can also be obtained using the seismic data directly (recorded seismic waves). This alternative requires minimal pre-processing and can be used to directly incorporate the crosswell seismic data in the history matching workflow. The only required modification of the workflow is the incorporation of a ray-tracing module, which will be used in conjunction with the petro-elastic module to simulate the seismic response of the medium.

To exemplify this alternative methodology we assimilated zero-offset travel-time data in an analogous way as the previous workflow. The only difference being the type of crosswell data being included in the history matching process. The zero-offset travel-time data is the time required to the waves to travel from the sources to the receivers. This zero-offset travel time was calculated based on a ray-tracing package.

Figure 26:
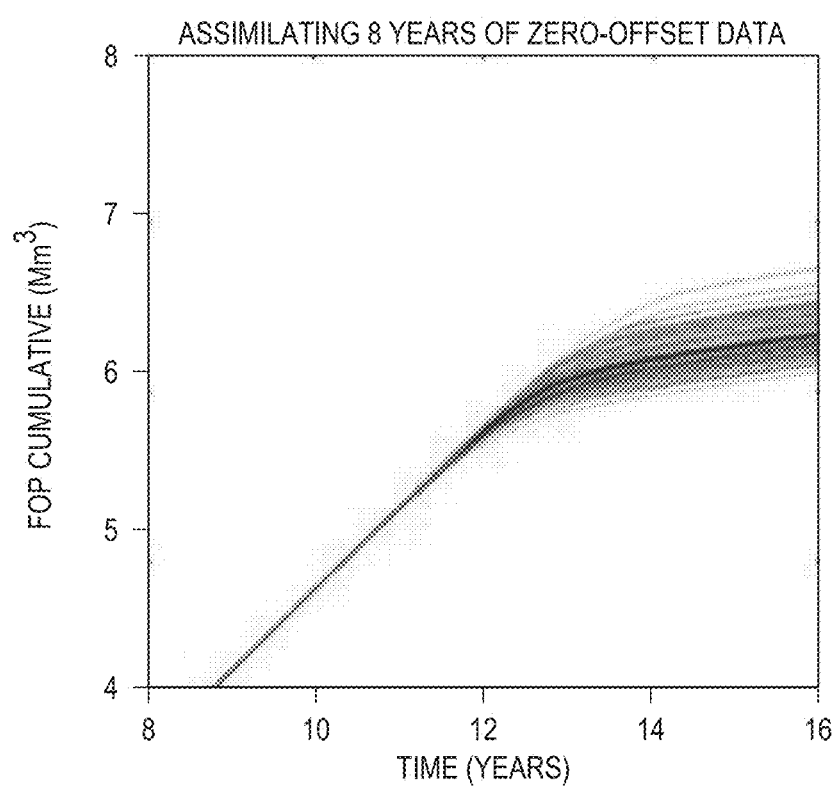
FIG. 26 is a plot showing the potential cumulative oil production from a model reservoir for various possible porosities and permeabilities based on the joint assimilation of production and time-lapse zero-offset travel-time crosswell data.
Figure 27:
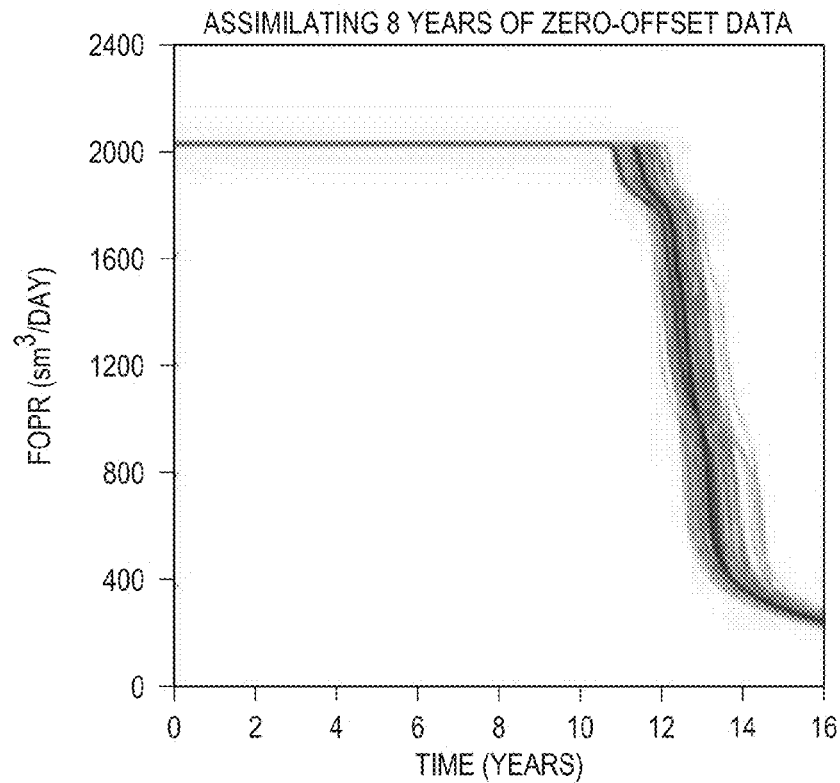
FIG. 27 is a plot showing the potential production plateau duration from a model reservoir for various possible porosities and permeabilities based on the joint assimilation of production and time-lapse zero-offset travel-time crosswell data.

The results obtained in scenario are shown in the FIGS. 26 and 27 The improvements in the history matching are not as significant as before but still considerable when compared with the baseline. The time-lapse data obtained under these circumstances is indicative of the water flood front movement, as the water saturation increases from the injector towards the producer. Thus for real applications it may not allow fine resolution updates, however a critical information, the water flood displacement can still be captured.

In certain scenarios the use of Gassmann equations may become inadequate. This is the case when high frequencies (higher than 100 Hz) are used in the seismic survey to image poorly consolidated sandstones for example. Gassmann equations do not take into account attenuation due to viscous flow.

It is important to highlight that the $V_p$ component derived from the Biot's model is an upper limit to high frequencies. In real case scenarios, the frequencies used in such imaging technique are in an intermediate range, usually between 400 Hz to 2.5 kHz. For some rock types the velocity dispersion effect can be observed even at seismic frequencies, which is the case for some sandstone sediments as explained by Masson, Y. J., Pride, R. S., Nihei, K. T., 2006, *Finite Difference Modeling Of Biot's Poroelastic Equations At*

Seismic Frequencies, Journal Of Geophysical Research: Solid Earth (1978-2012) 111 (B10).

To overcome this limitation, the Petro-Elastic Module M of the present invention uses, as noted above, the fast velocity component of the Biot mode, which is obtained from seismic tomography. This avoids the need to invert the data (seismic inversion to obtain the acoustic impedance). The fast velocity component, which is more sensitive to fluid displacement, can used as time-lapse data attribute.

The present invention, can take advantage of Biot equation modeling methodology is through the use of crosswell data. The source frequencies used for such surveys can be much higher than the ones used in surface seismic surveys for 4D surveying. An additional advantage in this case the quality and significance of the data provided. At high frequencies, the $V_p$ component of the velocity field becomes more sensitive to fluid displacement, providing more information about the fluid displacement in the reservoir. This may be challenging to measure in practical applications due to the range of frequencies used in real studies; for most rocks the velocity dispersion effect is only observed at laboratory frequencies exceeding several MHz. This approach may still however yield good results in rock formations where the critical frequency is low enough to enable velocity dispersion observations at the range of imaged frequencies.

Figure 30:
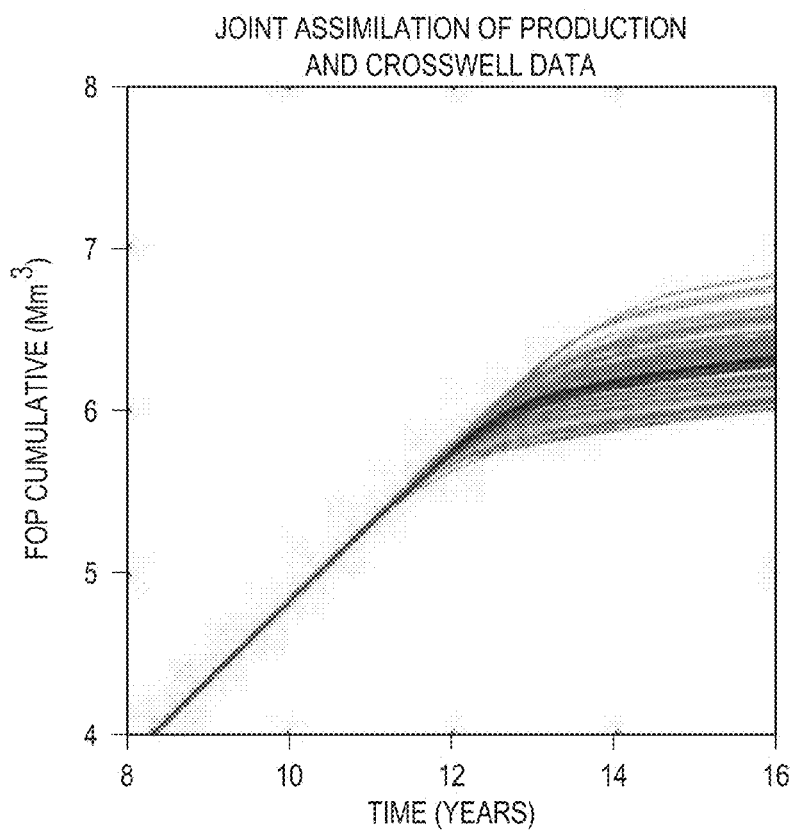
FIG. 30 is a plot showing the potential cumulative oil production from a model reservoir for various possible porosities and permeabilities based on the joint assimilation of production and time-lapse crosswell data.
Figure 31:
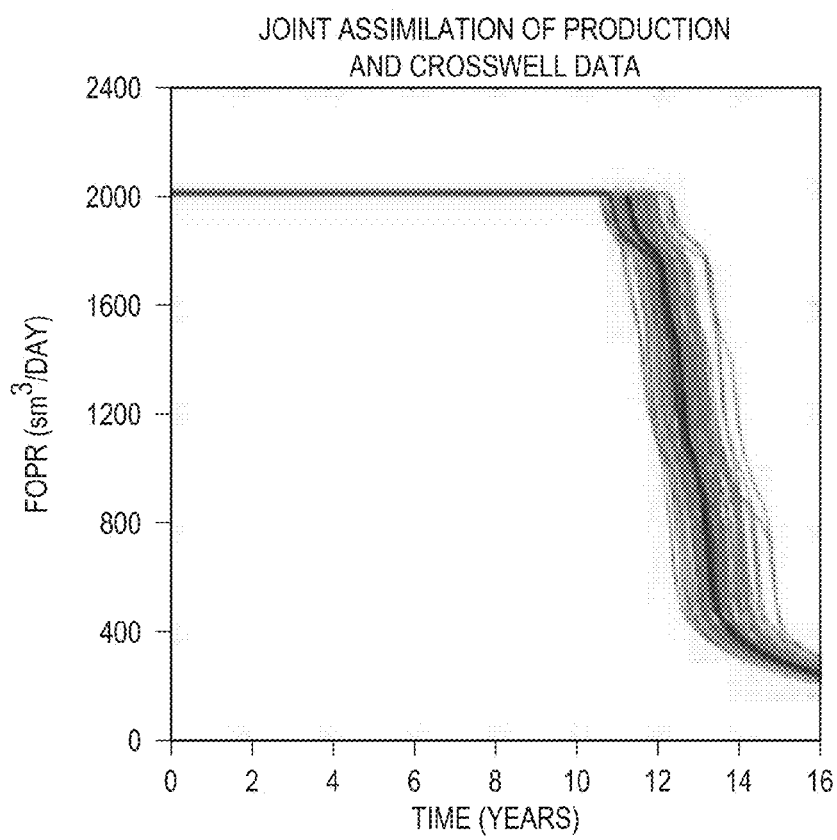
FIG. 31 is a plot showing the potential production plateau duration from a model reservoir for various possible porosities and permeabilities based on the joint assimilation of production and time-lapse crosswell data.
Figure 32:
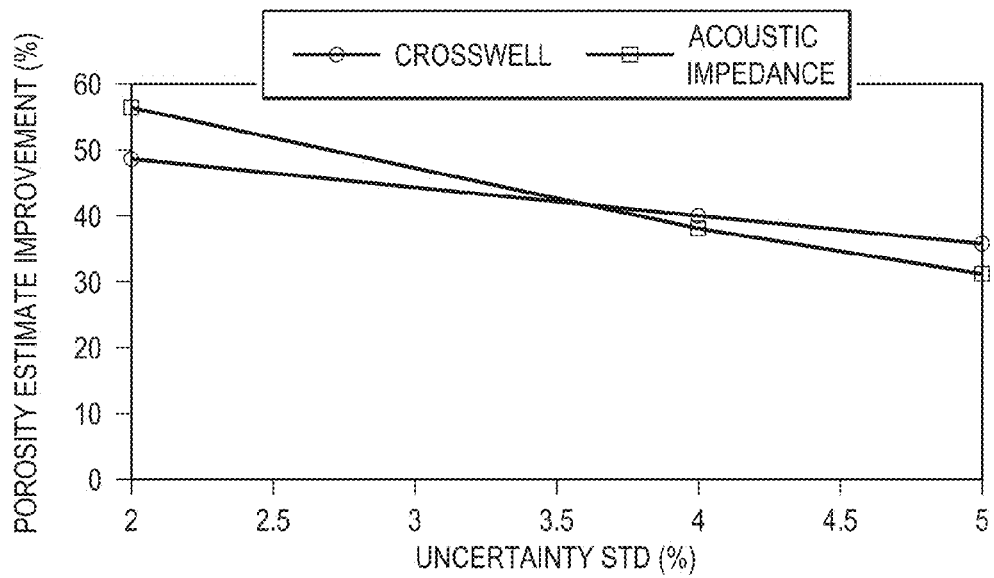
FIG. 32 is a comparison plot of porosity estimate improvement obtained with time-lapse acoustic impedance data and with crosswell time-lapse seismic survey data using high frequency waves according to the present invention.

The assimilation results obtained using the fast velocity component are summarized in the FIGS. 30 and 31. All the simulations assume a stipulated error (STD) of 2%. Crosswell experiments provide high resolution data, the uncertainty expected in such scenario is small. The feasibility of using high frequency time-lapse crosswell experiments to improve history matching results can be observed in FIG. 32. FIG. 32 is a comparison plot of improvement in the porosity estimate according to the seismic attribute and configuration used. The crosswell approach can be compared against a full field time-lapse seismic survey where the acoustic impedance is used as seismic attribute. For small uncertainties in the dataset the amount of data present (full field time-lapse survey) provides more information, but as the quality of the dataset deteriorates crosswell experiments become more robust. Consequently, the methodology of the present invention can generate as much information as the currently used ones for history matching purposes.

The primary problem solved is the issue with acquisition and processing of 4D data in challenging conditions (onshore reservoirs with alterations over time in the surface environment making it impossible to reshoot seismic) that prevents 4D data being available for use in history matching studies for onshore reservoirs.

CONCLUSION

The time-lapse crosswell dataset contains information about the fluid displacement movement in the medium, making such data ideal for history matching applications. This dataset is easier to be obtained than conventional surface seismic and cheaper.

The acquisition setup can easily be reproduced, which is not usually possible in surface seismic surveys (onshore). The cost is also reduced considerably because the data is collected only at specific locations. In addition, the higher spatial resolution (cross-section) and sensitivity of the data to the fluid content allows the construction of a more detailed model.

Further, the acquisition of crosswell data is lapsed in time. At the same location and using the same initial configuration, more than one survey is performed, each at different times after fluid movement as a result of reservoir production. The time-lapse difference between the surveys it then incorporated in the history matching process. This is efficiently performed by an automated history matching workflow based on Ensemble Kalman Filtering (EnKF). A petrophysical model in the Petro-Elastic Module is built to predict rock properties (velocity and acoustic impedance) based on reservoir properties (pressure, saturation, porosity, permeability and other if desired) as these vary during production from the reservoir. The petrophysical model with the present invention replaces the standard Gassmann's equations which do not take in account attenuation and dispersion at higher frequencies.

The EnKF methodology uses a set of geological realizations to take the initial uncertainty in the model and by a probabilistic inversion process (Bayesian inversion). During the EnKF update porosity, permeability, saturation and pressure are corrected to better match the production and time lapse data collected. Thus a set is history matched models is produced. Consequently an uncertainty range is also provided for the forecast model.

The velocity attribute can be mapped through a crosswell tomography and assimilated directly in the history matching workflow. There is no need to perform a seismic inversion to obtain the acoustic impedance attribute. This reduces the computational cost required to process the data and incorporate it in the data assimilation workflow.

An unexpected feature obtained from this methodology is the mitigation of a common problem faced during the assimilation of 4D seismic data using Ensemble Kalman Filtering. The overshooting problem in porosity and permeability estimation. 4D seismic data is spatially dense while production data is sparse. The smaller quantity of production data available for history matching leads to an overshooting problem. By using the present methodology the amount of seismic data used is several orders of magnitude smaller, leading to a more balanced trade-off between time lapse and production data.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined methodology, or in the performance and utilization thereof, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of mapping fluid displacement changes in an onshore reservoir producing hydrocarbon fluids from wells by history matching in a computer a reservoir model of the reservoir based on actual production from the reservoir over time and on determined reservoir formation permeability, the computer having a memory, a processor, a reservoir simulator module, a petro-elastic module, a history matching module and an output display, the method of mapping fluid displacement changes from time lapse differences in crosswell seismic surveys of the reservoir and history matching of predicted reservoir performance comprising the steps of:

(a) conducting a baseline crosswell seismic survey between wells in the reservoir before production of fluids from the reservoir;
(b) conducting a subsequent crosswell seismic survey between wells in the reservoir during production from the reservoir;
(c) storing in the memory computer operable instructions causing the computer to map the fluid displacement changes in the reservoir over time by performing the steps of:
(d) forecasting production performance rates and pressures from the reservoir with the reservoir simulator module under control of the stored computer operable instructions;
(e) processing the baseline crosswell seismic survey in the processor of the computer under control of the stored computer operable instructions to provide a baseline reservoir formation permeability by performing the steps of:
  (1) obtaining in the computer travel times of seismic energy between the wells during the baseline crosswell seismic survey;
  (2) performing crosswell tomography in the computer on the obtained travel times to obtain crosswell baseline tomography;
  (3) determining from the crosswell baseline tomography a baseline reservoir formation permeability;
(f) updating the reservoir simulator module with the baseline reservoir formation permeability under control of the stored computer operable instructions to determine with the updated reservoir simulation module predicted reservoir performance rates and pressures over time during production from the reservoir;
(g) determining with the petro-elastic module under control of the stored computer operable instructions a baseline crosswell seismic survey between the wells in the reservoir;
(h) the reservoir simulator module under control of the stored computer operable instructions forwarding in time during production from the reservoir;
(i) determining with the petro-elastic module under control of the stored computer operable instructions a monitor crosswell seismic survey between the wells in the reservoir after fluid displacement in the reservoir and lapse of time during production from the reservoir;
(j) determining under control of the stored computer operable instructions a time lapse difference between the monitor crosswell survey and the baseline crosswell seismic survey;
(k) performing under control of the stored computer operable instructions history matching in the history matching module of the predicted reservoir performance rates with the predicted reservoir performance rates and pressures during fluid production from the reservoir; and
(l) adjusting the reservoir model with the reservoir simulator module under control of the stored computer operable instructions for mapping fluid displacement changes in the reservoir based on the performed history matching and the determined time lapse differences; and
(m) forming with the output display under control of the stored computer operable instructions an output image of the adjusted reservoir model to map the fluid displacement changes in the reservoir over time.

2. The method of claim 1, further including the step of: performing in the computer under control of the stored computer operable instructions a forecast of production from the reservoir with the adjusted reservoir model.

3. The method of claim 1, further including the step of: storing in the memory of the computer under control of the stored computer operable instructions the updated value of the reservoir formation permeability after fluid displacement and lapse of time.

4. The method of claim 1, further including the step of: the output display forming under control of the stored computer operable instructions an output image from the computer of the updated value of the reservoir formation permeability after fluid displacement.

5. The method of claim 1, wherein the petro-elastic module in performing the step of determining an updated value of the reservoir formation permeability performs the step of:
forming a Biot velocity model based on the crosswell tomography.

6. The method of claim 1, wherein the history matching module in performing history matching performs the step of:
performing Ensemble Kalman filtering in the computer of the reservoir formation permeability data to condition the reservoir model.

7. A computer implemented method of mapping fluid displacement changes in an onshore reservoir producing hydrocarbon fluids from wells by history matching a reservoir model of the reservoir based on actual production from the reservoir over time and on at least one determined reservoir formation permeability, based on results of a baseline crosswell seismic survey conducted between wells in the reservoir before production of fluids from the reservoir to provide a baseline crosswell seismic survey and further based on a subsequent crosswell seismic survey between the wells in the reservoir during production from the reservoir for history matching, the method being performed in a data processing system having a memory, a processor, a reservoir simulator module, a petro-elastic module, a history matching module and an output display, the method of mapping fluid displacement changes- comprising the computer implemented steps of:
(a) storing in the memory computer operable instructions causing the data processing system to map the fluid displacement changes in the reservoir over time by performing the steps of:.
(b) forecasting production performance rates and pressures from the reservoir with the reservoir simulator under control of the stored computer operable instructions;
(c) processing the baseline crosswell seismic survey in the processor under control of the stored computer operable instructions to provide a baseline formation permeability for the history matching by performing the steps of:
  (1) obtaining in the computer travel times of seismic energy between the wells during the baseline crosswell seismic survey;
  (2) performing crosswell tomography in the computer on the obtained travel times to obtain crosswell baseline tomography;
  (3) determining from the crosswell baseline tomography a baseline reservoir formation permeability;
(d) updating the reservoir simulator module with the baseline reservoir formation permeability under control of the stored computer operable instructions to determine with the updated reservoir simulation module predicted reservoir performance rates and pressures over time during production from the reservoir;

(e) determining with the petro-elastic module under control of the stored computer operable instructions a baseline crosswell seismic survey between the wells in the reservoir;

(f) the reservoir simulator module under control of the stored computer operable instructions forwarding in time during production from the reservoir;

(g) determining with the petro-elastic module under control of the stored computer operable instructions a monitor crosswell seismic survey between the wells in the reservoir after fluid displacement in the reservoir and lapse of time during production from the reservoir;

(h) performing under control of the stored computer operable instructions history matching in the history matching module of the computer of the forecast reservoir performance rates and pressures with the updated reservoir performance rates and pressures during fluid production from the reservoir;

(i) adjusting the reservoir model with the reservoir simulator module under control of the stored computer operable instructions for mapping fluid displacement changes in the reservoir based on the performed history matching and the determined time lapse differences; and (j) forming with the output display under control of the stored computer operable instructions an output image of the adjusted reservoir model to map the fluid displacement changes in the reservoir over time.

8. The computer implemented method of claim 7, further including the computer implemented step of:

performing in the processor under control of the stored computer operable instructions a forecast of production from the reservoir with the adjusted reservoir model.

9. The computer implemented method of claim 7, further including the computer implemented step of:

storing in the memory of the computer under control of the stored computer operable instructions the updated value of the reservoir formation permeability after fluid displacement.

10. The computer implemented method of claim 7, further including the computer implemented step of:

forming with the output display under control of the stored computer operable instructions an output image of the updated value of the reservoir formation permeability after fluid displacement.

11. The computer implemented method of claim 7, wherein the petro-elastic module in performing the step of determining an updated value of the reservoir formation permeability performs the step of:

forming a Biot velocity model based on the crosswell monitor tomography.

12. The computer implemented method of claim 7, wherein the history matching module in performing history matching performs the step of:

performing Ensemble Kalman filtering of the reservoir formation permeability data to condition the reservoir model.

13. A data processing system for mapping fluid displacement changes in an onshore reservoir producing hydrocarbon fluids from wells by history matching a reservoir model of the reservoir based on actual production from the reservoir over time and based on at least one determined reservoir formation permeability from a baseline crosswell seismic survey conducted between wells in the reservoir before production of fluids from the reservoir and further based on a subsequent crosswell seismic survey between the wells in the reservoir during production from the reservoir for the history matching, the data processing system comprising:

(a) a memory storing computer operable instructions causing the data processing system to map the fluid displacement changes in the reservoir over time;

(b) a processor under control of the stored computer operable instructions providing a baseline formation permeability for the history matching by performing the steps of:
(1) obtaining in the computer travel times of seismic energy between the wells during the baseline seismic survey;
(2) performing crosswell tomography in the computer on the obtained travel times to obtain crosswell baseline tomography;
(3) determining from the crosswell baseline tomography a baseline reservoir formation permeability;

(c) a reservoir simulator module determining forecast reservoir performance rates and pressures over time;

(d) a petro-elastic module under control of the stored computer operable instructions determining a baseline crosswell seismic survey between the wells in the reservoir;

(e) the reservoir simulator under control of the stored computer operable instructions forwarding in time during production from the reservoir;

(f) the petro-elastic module further operating under control of the stored computer operable instructions to determine a monitor crosswell seismic survey between the wells in the reservoir after fluid displacement in the reservoir and lapse of time during production from the reservoir;

(g) the processor further determining under control of the stored computer operable instructions a time lapse difference between the monitor crosswell survey and the baseline crosswell seismic survey;

(h) history matching module under control of the stored computer operable instructions performing history matching of the predicted reservoir performance rates and pressures after fluid production from the reservoir;

(i) the reservoir simulator module under control of the stored computer operable instructions adjusting the reservoir model for mapping fluid displacement changes in the reservoir based on the performed history matching and the determined time lapse differences; and (j) an output display under control of the stored computer operable instructions to form a display of the adjusted reservoir model to map the fluid displacement changes in the reservoir over time.

14. The data processing system of claim 13, further including the processor under control of the stored computer operable instructions to perform the step of:

performing a forecast of production from the reservoir with the adjusted reservoir model.

15. The data processing system of claim 13, wherein the petro-elastic module in determining an updated measure of the reservoir formation permeability performs the step of:

forming a Biot velocity model based on the crosswell monitor tomography.

16. The data processing system of claim 13, wherein the history matching module in performing history matching performs step of:

performing Ensemble Kalman filtering of the reservoir formation permeability data to condition the reservoir model.

17. A method of mapping fluid displacement changes in an onshore reservoir producing hydrocarbon fluids from wells by history matching in a computer a reservoir model of the reservoir based on actual production from the reservoir over time and on at least one determined reservoir formation porosity, the computer having a memory, a processor, a reservoir simulator module, a petro-elastic module, a history matching module and an output display, the method of mapping fluid displacement changes from time lapse differences in crosswell seismic surveys of the reservoir and history matching of predicted reservoir performance comprising the steps of:

(a) conducting a baseline crosswell seismic survey between wells in the reservoir before production of fluids from the reservoir to provide a baseline seismic survey for history matching;

(b) conducting a subsequent crosswell seismic survey between wells in the reservoir during production from the reservoir;

(c) storing in the memory computer operable instructions causing the computer to map the fluid displacement changes in the reservoir over time by performing the steps of:

(d) forecasting production performance rates and pressures from the reservoir with the reservoir simulator module under control of the stored computer operable instructions;

(e) processing the baseline crosswell seismic survey in the processor of the computer under control of the stored computer operable instructions to provide a baseline reservoir formation porosity by performing the steps of:

(1) obtaining in the computer travel times of seismic energy between the wells during the baseline crosswell seismic survey;

(2) performing crosswell tomography in the computer on the obtained travel times to obtain crosswell baseline tomography;

(3) determining from the crosswell baseline tomography a baseline reservoir formation porosity;

(f) updating the reservoir simulator module with the baseline reservoir formation porosity under control of the stored computer operable instructions to determine with the updated reservoir simulation module predicted reservoir performance rates and pressures rates and pressures over time during production from the reservoir;

(g) determining with the petro-elastic module under control of the stored computer operable instructions a monitor crosswell seismic survey between the wells in the reservoir after fluid displacement in the reservoir and lapse of time during production from the reservoir;

(h) determining under control of the stored computer operable instructions a time lapse difference between the monitor crosswell survey and the baseline crosswell seismic survey;

(i) performing under control of the stored computer operable instructions history matching in the history matching module of the predicted reservoir performance rates with the predicted performance rates and pressures during fluid production from the reservoir;

(j) adjusting the reservoir model with the reservoir simulator module under control of the stored computer operable instructions for mapping fluid displacement changes in the reservoir based on the performed history matching and the determined time lapse differences; and (k) forming with the output display under control of the stored computer operable instructions an output image of the adjusted reservoir model to map the fluid displacement changes in the reservoir over time.

18. A computer implemented method of mapping fluid displacement changes in an onshore reservoir producing hydrocarbon fluids from wells by history matching a reservoir model of the reservoir based on actual production from the reservoir over time and on at least one determined reservoir formation porosity, based on results of a baseline crosswell seismic survey conducted between wells in the reservoir before production of fluids from the reservoir to provide a baseline crosswell seismic survey and further based on a subsequent crosswell seismic survey between the wells in the reservoir during production from the reservoir for history matching, the computer having a memory, a processor, a reservoir simulator module, a petro-elastic module, a history matching module and an output display, the method of mapping fluid displacement changes comprising the computer implemented steps of:

(a) storing in the memory computer operable instructions causing the computer to map the fluid displacement changes in the reservoir over time by performing the steps of:.

(b) forecasting production performance rates and pressures from the reservoir with the reservoir simulator module under control of the stored computer operable instructions;

(c) processing the baseline crosswell seismic survey in the processor under control of the stored computer operable instructions to provide a baseline formation porosity for the history matching by performing the steps of:

(1) obtaining in the computer travel times of seismic energy between the wells during the baseline crosswell seismic survey;

(2) performing crosswell tomography in the computer on the obtained travel times to obtain crosswell baseline tomography;

(3) determining from the crosswell baseline tomography a baseline reservoir formation porosity;

(d) updating the reservoir simulator module with the baseline reservoir formation permeability under control of the stored computer operable instructions to determine with the updated reservoir simulation module predicted reservoir performance rates and pressures over time during production from the reservoir;

(e) determining with the petro-elastic module under control of the stored computer operable instructions a baseline crosswell seismic survey between the wells in the reservoir;

(f) forwarding the reservoir simulator under control of the stored computer operable instructions in time during production from the reservoir;

(g) determining with the petro-elastic module under control of the stored computer operable instructions a monitor crosswell seismic survey between the wells in the reservoir after fluid displacement in the reservoir and lapse of time during production from the reservoir;

(h) performing under control of the stored computer operable instructions history matching in the history matching module of the computer of the predicted reservoir performance rates and pressures after fluid production from the reservoir and passage of time;

(i) adjusting the reservoir model with the reservoir simulator module under control of the stored computer operable instructions for mapping fluid displacement changes in the reservoir based on the performed history matching and the determined time lapse differences; and (j) forming with the output display under control of the stored computer operable instructions an output image of the adjusted reservoir model to map the fluid displacement changes in the reservoir over time.

19. A data processing system for mapping fluid displacement changes in an onshore reservoir producing hydrocarbon fluids from wells by history matching a reservoir model of the reservoir based on actual production from the reservoir over time and based on at least one determined reservoir formation porosity from a baseline crosswell seismic survey conducted between wells in the reservoir before production of fluids from the reservoir and further based on a subsequent crosswell seismic survey between the wells in the reservoir during production from the reservoir for the history matching, the data processing system comprising:

(a) a memory storing computer operable instructions causing the data processing system to map the fluid displacement changes in the reservoir over time;

(b) a processor operating under control of the stored computer operable instructions to provide a baseline formation porosity for the history matching by performing the steps of:

(1) obtaining in the computer travel times of seismic energy between the wells during the baseline seismic survey;

(2) performing crosswell tomography in the computer on the obtained travel times to obtain crosswell baseline tomography;

(3) determining from the crosswell baseline tomography a baseline reservoir formation porosity;

(c) a reservoir simulator module determining predicted reservoir performance rates and pressures over time;

(d) a petro-elastic module under control of the stored computer operable instructions determining a baseline crosswell seismic survey between the wells in the reservoir;

(e) the reservoir simulator module under control of the stored computer operable instructions forwarding in time during production from the reservoir;

(f) the petro-elastic module further operating under control of the stored computer operable instructions to determine a monitor crosswell seismic survey between the wells in the reservoir after fluid displacement in the reservoir and lapse of time during production from the reservoir;

(g) the processor further determining under control of the stored computer operable instructions a time lapse difference between the monitor crosswell seismic survey and the baseline crosswell seismic survey;

(h) a history matching module under control of the stored computer operable instructions performing history matching of the predicted reservoir performance rates and pressures after fluid production from the reservoir;

(i) the reservoir simulator module under control of the stored computer operable instructions adjusting the reservoir model for mapping fluid displacement changes in the reservoir based on the performed history matching and the determined time lapse differences; and (j) an output display operating under control of the stored computer operable instructions to form a display of the adjusted reservoir model to map the fluid displacement changes in the reservoir over time.

* * * * *